(12) United States Patent
Zhang et al.

(10) Patent No.: US 10,725,656 B2
(45) Date of Patent: Jul. 28, 2020

(54) METHOD, SYSTEM AND DEVICE FOR INPUTTING TEXT BY CONSECUTIVE SLIDE

(71) Applicant: SHANGHAI CHULE (COOTEK) INFORMATION TECHNOLOGY CO., LTD., Shanghai (CN)

(72) Inventors: Kan Zhang, Shanghai (CN); Jialiang Wang, Shanghai (CN); Jingshen Wu, Shanghai (CN); Hanxiong Wang, Shanghai (CN); Haichao Xie, Shanghai (CN)

(73) Assignee: SHANGHAI CHULE (COOTEK) INFORMATION TECHNOLOGY CO., LTD., Shanghai (CN)

(*) Notice: Subject to any disclaimer, the term of this patent is extended or adjusted under 35 U.S.C. 154(b) by 618 days.

(21) Appl. No.: 14/770,401

(22) PCT Filed: Dec. 23, 2013

(86) PCT No.: PCT/CN2013/090207
§ 371 (c)(1),
(2) Date: Dec. 1, 2015

(87) PCT Pub. No.: WO2014/127671
PCT Pub. Date: Aug. 28, 2014

(65) Prior Publication Data
US 2016/0328147 A1    Nov. 10, 2016

(30) Foreign Application Priority Data

Feb. 25, 2013  (CN) .......................... 2013 1 0058995
May 17, 2013   (CN) .......................... 2013 1 0185771

(51) Int. Cl.
*G06F 3/0488*   (2013.01)
*G06F 3/023*    (2006.01)
(Continued)

(52) U.S. Cl.
CPC ........ *G06F 3/04886* (2013.01); *G06F 3/0237* (2013.01); *G06F 3/0482* (2013.01);
(Continued)

(58) Field of Classification Search
CPC ............... G06F 3/04886; G06F 3/0237; G06F 3/04883; G06F 17/276; G06F 3/0236; G06F 3/0482; G06F 3/04845; G06F 3/04847
See application file for complete search history.

(56) References Cited

U.S. PATENT DOCUMENTS 6,094,197 A  *  7/2000  Buxton ................. G06F 3/0482
                                                              341/22
8,701,032 B1 *  4/2014  Zhai .................... G06F 3/04886
                                                              715/773
(Continued)

FOREIGN PATENT DOCUMENTS

CN         101266520 A       9/2008
CN         102253798 A       11/2011
(Continued)

OTHER PUBLICATIONS

International Search Report, dated Apr. 3, 2014, in PCT/CN2013/090207.
(Continued)

*Primary Examiner* — Kieu D Vu
*Assistant Examiner* — Blaine T. Basom
(74) *Attorney, Agent, or Firm* — Flener IP & Business Law; Zareefa B. Flener

(57) ABSTRACT

This invention relates to a method for inputting text by consecutive slide, comprising: detecting whether a consecutive slide input mode is triggered in response to an input of a user; detecting and recording a sliding trajectory of a user on a touch-screen and inputting a corresponding word; and
(Continued)

predicting a possible word based on a context and another input of the user and updating the layout of a keyboard according to at least one of the results of the prediction. The invention also relates to a system that implements the method, as well as a corresponding device. The method, system and device increase input efficiency and achieve smart prediction and smart arrangement of candidate words in an area of the keyboard.

21 Claims, 25 Drawing Sheets

(51) Int. Cl.
    *G06F 3/0482*     (2013.01)
    *G06F 3/0484*     (2013.01)
(52) U.S. Cl.
    CPC ...... *G06F 3/04845* (2013.01); *G06F 3/04847* (2013.01); *G06F 3/04883* (2013.01)

(56) References Cited

U.S. PATENT DOCUMENTS

| | | | | |
|---|---|---|---|---|
| 8,701,050 | B1* | 4/2014 | Starner | G06F 3/04895 |
| | | | | 715/773 |
| 8,972,444 | B2* | 3/2015 | Baluja | G06F 3/0237 |
| | | | | 707/771 |
| 9,798,718 | B2* | 10/2017 | Zhai | G06F 3/04886 |
| 2006/0265648 | A1 | 11/2006 | Rainisto | |
| 2012/0149477 | A1 | 6/2012 | Park | |
| 2012/0223889 | A1 | 9/2012 | Medlock et al. | |
| 2012/0268389 | A1 | 10/2012 | Yaron | |
| 2013/0176228 | A1* | 7/2013 | Griffin | G06F 17/276 |
| | | | | 345/168 |
| 2013/0222249 | A1* | 8/2013 | Pasquero | G06F 3/04886 |
| | | | | 345/168 |
| 2014/0104177 | A1* | 4/2014 | Ouyang | G06F 3/04883 |
| | | | | 345/168 |
| 2014/0237356 | A1* | 8/2014 | Durga | G06F 17/276 |
| | | | | 715/256 |
| 2014/0375569 | A1 | 12/2014 | Park et al. | |

FOREIGN PATENT DOCUMENTS

| | | | |
|---|---|---|---|
| CN | 201110155355.4 | A | 11/2011 |
| CN | 102508555 | A | 6/2012 |
| CN | 102890615 | A | 1/2013 |
| CN | 102893588 | A | 1/2013 |
| CN | 201180020650.7 | A | 1/2013 |
| CN | 105027040 | A | 11/2015 |
| KR | 20070043673 | A | 4/2007 |
| KR | 20110015958 | A | 2/2011 |
| KR | 20120016060 | A | 2/2012 |
| KR | 20120083293 | A | 7/2012 |
| KR | 20150109447 | A | 10/2015 |
| WO | 2011025200 | A2 | 3/2011 |
| WO | 2011105816 | A2 | 9/2011 |
| WO | 2011105816 | A3 | 12/2011 |
| WO | 2012167580 | A1 | 12/2012 |

OTHER PUBLICATIONS

International Preliminary Report on Patentability, dated Aug. 25, 2015, in PCT/CN2013/090207.
International Search Report, PCT/CN2013/090207, dated Apr. 3, 2014.
Second Office Action, The State Intellectual Property Office of People's Republic China, 201310185771.8, Shanghai Chule Information Science & Technology Co., Ltd., Method for Continuously Inputting Texts by Sliding, System and Equipment.
First Office Action, The State Intellectual Property Office of People's Republic China, 201310185771.8, Shanghai Chule Information Science & Technology Co., Ltd., Method for Continuously Inputting Texts by Sliding, System and Equipment.
Patent Cooperation Treaty, Written Opinion of the International Searching Authority, dated Apr. 3, 2014, PCT/CN2013/090207, Shanghai Chule (Cootek) Information Technology Co., Ltd.

* cited by examiner

METHOD, SYSTEM AND DEVICE FOR INPUTTING TEXT BY CONSECUTIVE SLIDE

TECHNICAL FIELD

The present invention relates to information input to electronic devices and, in particular, to consecutively sliding input to touch-screen electronic devices. More specifically, the invention relates to methods, system and device for inputting text by consecutive slide.

BACKGROUND

Referring to FIG. 1, a conventional touch-screen electronic device usually has a text area 110 that displays input text or a popup message and a keyboard area 120 allowing a use's text input. In addition, an area 130 which presents candidate words will also generally appear around keyboard area 120 during the user's input. In order to achieve an optimal balance between screen usage efficiency and the user's visual experience, area 130 is typically disposed on top of keyboard area 120 and is so configured that the candidate words are laterally arranged one by one. The conventional touch-screen input techniques allow for selection of only one word by a single input (defined hereinafter as a touch that a finger or an input instrument, such as a stylus, makes since it comes into contact with the screen until it leaves the screen). For example, in such techniques, a tapping or other motion is allowed to cause the input of a single word, and even with a conventional touch-screen keyboard which allows text input by sliding trajectories, a sliding trajectory completed in one motion can only be parsed as one word. This leads to a great reduction in information input efficiency, increased operating complexity, and significant user inconveniences. Therefore, there is a great need in the field of information input to touch-screen electronic devices for enabling the input of a sequence of words or a complete sentence through a single input.

SUMMARY

The present invention addresses the above-described disadvantages of the prior art by presenting methods, system and device for inputting text by consecutive slide, which offer the benefits of a significant increase in input efficiency, allowing input of multiple successively consecutive words or even a whole sentence of text by a single continuous sliding trajectory, capability of smart word prediction and arrangement, and flexible adaptation to various keyboard layouts, even including those defined by the user.

According to an aspect of embodiments of the present invention, there is provided a method for inputting text by consecutive slide, comprising: predicting a possible word based on a context and an input of a user; displaying at least one of the results of the prediction in a key area of a keyboard; and detecting and recording a sliding trajectory of the user on a touch-screen, inputting a corresponding word and updating the layout of the keyboard.

According to an aspect of embodiments of the present invention, the prediction of the possible word includes one or a combination of: predicting a current possible word being input; predicting the current possible word when part, but not all, of its letters has been input by the user; predicting a related word of the current possible word; correcting an input of the user and predicting the current possible word based on the results of the correction; predicting one or more next words to be input by the user; and prediction based on one or more of word use frequencies, the user's input preference, linguistic models, syntax rules, context and other relevant statistical information.

More specifically, predicting the one or more next words includes one or a combination of: when letters input by the user have come to constitute a complete word, predicting the one or more next words based on a default one of the results of the prediction of the current word; and when a user has input and selected a word, predicting the one or more next words based on the selected word.

According to an aspect of embodiments of the present invention, displaying the at least one of the results of the prediction in the key area of the keyboard includes: word processing according to system-predefined word display and arrangement rules, including, for example, one or more of: letter correspondence-based display; inter-word distance and word length-based display; touch point position and trajectory-based display; and word use frequency, user input preference, linguistic models, syntax rules, context and other relevant statistical information-based display. Specifically, the letter correspondence-based display may include: first letter correspondence-based display, wherein the first letter comprises a first letter or a first phonetic alphabet; or correspondence to a next letter to be input, for example, a next letter or a next phonetic alphabet. The inter-word distance and word length-based display may include: determining whether target display regions of at least two words are excessively close to each other and, if true, only displaying one of the at least two words with a highest priority level or adjusting the target display region of each other one of the at least two words with a lower priority level. The inter-word distance and word length-based display may include: determining whether a length of a word affects another word to be displayed at an adjacent target display region and, if true, only displaying one of the two words with a high priority level or adjusting the target display region of the other of the two words with a low priority level. The touch point position and trajectory-based display may include: determining whether a target display region of a word is to be blocked by a current touch point and, if true, not displaying the word or adjusting its target display region. The touch point position and trajectory-based display may include: determining whether target display regions of at least two words are to be overlapped or blocked by a trajectory of a current touch point and, if true, for each of the at least two words, further determining, according to their priority levels, whether to display it or adjust its target display region, such that it will not be overlapped or blocked by a possible subsequent extension of the trajectory.

According to an aspect of embodiments of the present invention, displaying the at least one of the results of the prediction in the key area of the keyboard may further include: displaying at least one of words that have been processed in the key area of the keyboard or in predetermined region(s) of associated key(s). The predetermined region may be located above, at the top left of, at the top right of, under, at the bottom left of, or at the bottom right of the associated key, or at any position that is spaced apart from the associated key by a distance not exceeding a system-predefined distance threshold. In particular, displaying the at least one of the words that have been processed in the key area of the keyboard may further include one or a combination of: displaying the at least one of the words also in a candidate-word area; displaying at least one of the results of the prediction of the current possible word in the candidate-word area or a user-defined input area and displaying each of at least one of the results of the prediction of the one or more next possible words in a predetermined region of an associated key; and updating displayed content in the key area of the keyboard in a real-time manner according to an input of the user.

According to an aspect of embodiments of the present invention, the method may further comprise providing the user with an indication in the form of a multimedia action, for example, one or a combination of a visual indication, an auditory indication and a vibration. The indication may be provided, for example, for indicating empty prediction results, or for indicating a word of which a related word is to be input, or for notify the input of a word, or for prompting the user to trigger the consecutive slide input mode, or for notify that the consecutive slide input mode has been triggered, or for indicating displayed predicted next possible words.

According to an aspect of embodiments of the present invention, the method may further comprise detecting whether the consecutive slide input mode is triggered in response to an input of a user.

According to an aspect of embodiments of the present invention, detecting and recording the user's sliding trajectory on the touch-screen and inputting the corresponding word may include: determining whether the sliding trajectory meets a system-predefined word selection criterion. The word selection criterion may include: a touch point being located in a system-predefined, effective region associated with the word, for example, a region where the word is displayed or a region spaced apart from the word by a distance not exceeding a system-predefined distance threshold. The word selection criterion may further include: selecting a word by a sliding trajectory, for example, selection by a sliding trajectory crossing the word from one side to another side, or selection of a related word of the word by the sliding trajectory. In particular, the selection of the related word may include: making a sliding trajectory from a region where the word is displayed to a predetermined region, for example, a region of a space key, the candidate-word area, or another designated region; displaying related words of the concerned word in vicinity of the predetermined region; and selecting a corresponding one of the related words based on a predetermined operation of the user and replacing the word with the selected one of the related words. The word selection criterion may further include simultaneous multiple touch points.

According to an aspect of embodiments of the present invention, detecting and recording the user's sliding trajectory on the touch-screen and inputting the corresponding word may include: inputting the word meeting the word selection criterion to a text area, for example, directly inputting the selected word around the location of a cursor in the text area, or in the user-defined input area.

According to an aspect of embodiments of the present invention, updating the keyboard layout may include one or a combination of: displaying predicted words in the key area of the keyboard according to a current touch point of the user; in the event of a change occurring in the current touch point, recalculating and rearranging target display regions of the predicted words; determining whether the number of obtained words to be displayed exceeds a maximum displayable word number; determining whether the words are located on a trajectory of a possible sliding trajectory of the user and, if there is overlapping or blockage, only displaying one of the words with a highest priority level; determining whether a word to be displayed conflicts with words that have been displayed and displaying the predicted words according to the results of the determination; calculating associated effective regions of the words; determining whether the current touch point is located within the effective region of a word to be displayed; and processing a word unsuitable to be immediately displayed, for example, cancelling its display or rearranging it. The rearrangement may include: incrementally moving an initial target display region of the word to other regions of an associated key of the word; and if the word becomes suitable to be displayed within a predetermined number of increments, displaying it in the key area, otherwise, cancelling its display.

According to an aspect of embodiments of the present invention, the consecutive slide input mode may be triggered by one or more of: a sliding trajectory starting from the space key; a sliding trajectory starting from an arbitrarily designated key; a sliding trajectory starting from a sensitive point located away from the key area; a user-defined motion made around a displayed word; a predetermined motion made in an arbitrarily designated region; a predetermined action taken on a corresponding electronic device, for example, shaking it; and a sliding command input through other means, for example, voice input means, optical sensing input means, infrared sensing input means and pressure sensing input means. The user-defined motion may include one or a combination of: drawing a circle around the word, upward sliding, downward sliding, sliding to the left, sliding to the right, sliding along a predetermined direction from one side of the word to another side thereof, long pressing, drawing a predetermined pattern, and dragging the word to a predetermined region, for example, dragging the word the region of the space key. The predetermined motion may include one or a combination of: tapping, long pressing, drawing a predetermined pattern, and sliding along a predetermined direction, in a designated region. The designated region may include a region of the displayed word or a region spaced apart from the displayed word by a designated distance. The designated region may be a round, square, or oval region. The predetermined action may include shaking the electronic device.

According to an aspect of embodiments of the present invention, the method may further include: input word cancellation, for example, cancellation of only an immediately previously input word, or a user-defined number of previously input words, or all previously input word, by a predetermined action, for example, making a sliding trajectory from an area of the keyboard to the space key, or to a user-defined area, or beyond the keyboard.

According to an aspect of embodiments of the present invention, the consecutive slide input mode may be exited when the occurrence of a system-predefined exit triggering event is detected. The exit triggering event may include one or a combination of: the user terminating the touch, the user making a sliding trajectory to a predetermined area, absence of a possible next word, and the user selecting a predetermined word.

According to an aspect of embodiments of the present invention, the method may further include performing an anti-blockage treatment, for example, keyboard duplication, word relocation and word rearrangement, on word information displayed in the keyboard area during the continuous sliding trajectory based input.

According to another aspect of embodiments of the present invention, there is provided another method for inputting text by consecutive slide, comprising: detecting whether a consecutive slide input mode is triggered in response to an input of a user; detecting and recording a trajectory of the sliding trajectory of the user on a touch-screen and inputting a corresponding word; and predicting a possible word, for example, a current possible word being input, based on a context and another input of the user and updating a keyboard layout according to at least one of the results of the prediction.

According to still another aspect of embodiments of the present invention, there is provided a system for inputting text by consecutive slide, comprising at least: a dictionary database, adapted to store word information; a user interaction module adapted to process an interaction with a user; a display module, adapted to provide the user with displayed content; and an analysis and processing module, in communication with the dictionary database, user interaction module and display module, wherein, the user interaction module records information input in an area of a keyboard and transmits it to the analysis and processing module; the analysis and processing module receives the information and an event transmitted from the user interaction module, sorts and processes the information and event, obtains a list of words from the dictionary database based on selection rules, and passes the obtained list on to the display module, and the display module displays and arranges the words obtained from the analysis and processing module according to system-defined word display and arrangement rules in a key area of the keyboard and feeds information about the results of the display back to the analysis and processing module.

According to a further aspect of embodiments of the present invention, there is provided an electronic device, comprising at least a user interaction means and a processor, characterized in that the user interaction means acquires information about an operation of the user and feeds output information back to the user, and in that the processor is adapted to implement a method as defined above based on the acquired information about the operation of the user.

As described above, the methods, system and device according to the present invention can predict a series of candidate words or word combinations based on the context and the user's input preference and arrange them around corresponding keys of the keyboard according to predefined display rules. In addition, the user is allowed to make a sliding trajectory, i.e., a single operation, consecutively over the desired ones of the words or word combinations displayed in the keyboard to input multiple words, which can form a complete sentence or even a block of text. Moreover, the arrangement of the words or word combinations is flexibly adaptive to various keyboard layouts, for example, a QWERTY-based or other full-alphabet layout, a half-QWERTY layout, an alphanumeric keypad layout, and even a layout defined by the user. All of these achieve an effective increase in input efficiency and entail "smart" word prediction and arrangement.

DETAILED DESCRIPTION

The features of the present invention will become more apparent from the detailed description of specific embodiments set forth below.

Figure 1:
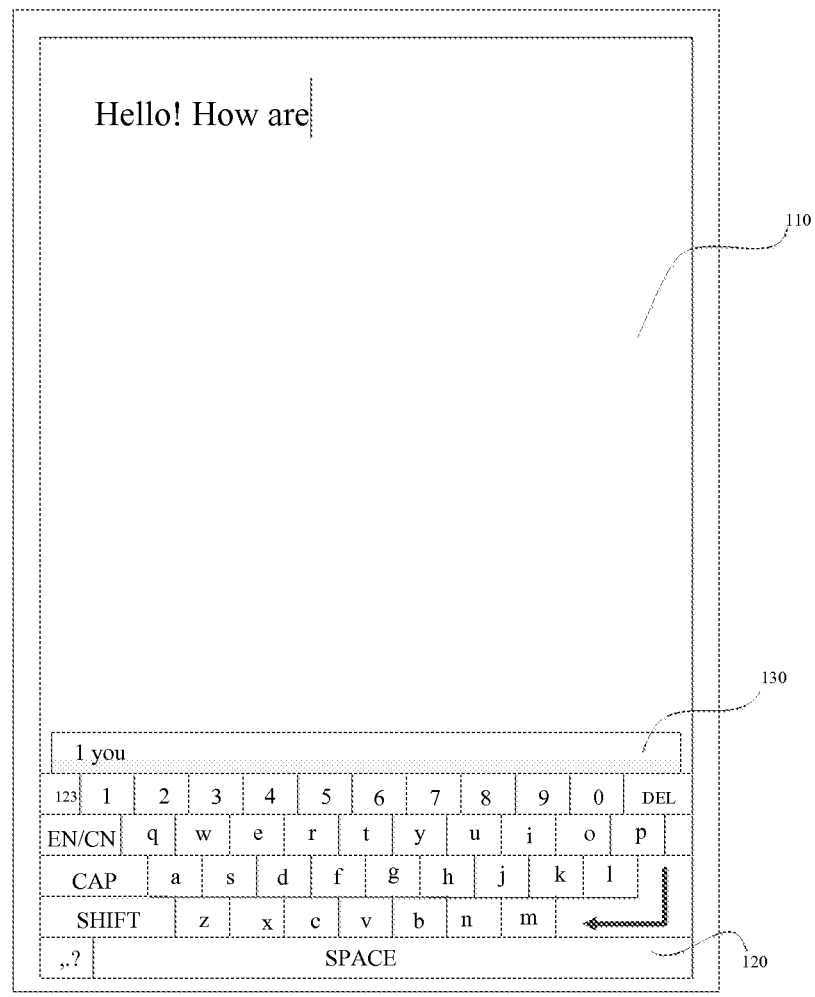
FIG. 1 is a diagram schematically illustrating a conventional touch-screen electronic device.
Figure 2:
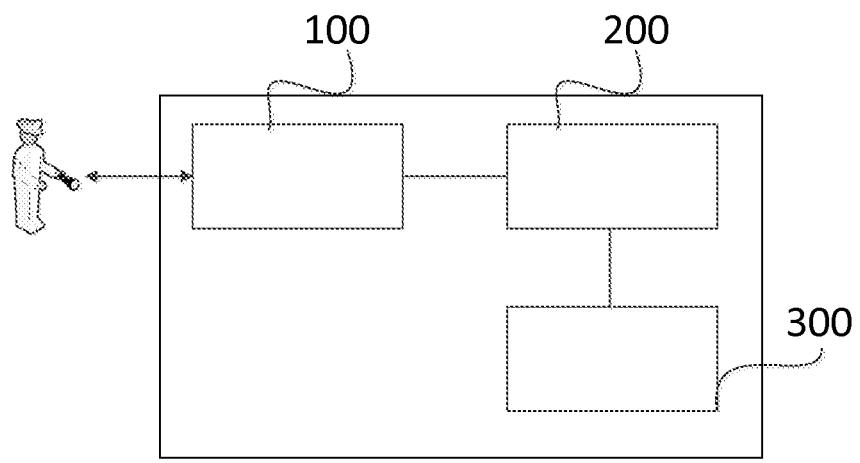
FIG. 2 depicts a schematic illustration of an electronic device suitable for a method for continuous sliding trajectory based text input according to the present invention.

FIG. 2 depicts a schematic illustration of an electronic device suitable for a method for continuous sliding trajectory based text input according to the present invention. The electronic device includes at least a user interaction means 100, a processor 200 and a memory 300.

A user may transmit input information to means 100 by at least one of: a tapping, sliding or other motion made by a stylus, finger or other means for making such motions; or voice from a microphone or other voice transmitter. Upon reception of the user's input information, means 100 relays the information to processor 200 for processing and feeds output information from processor 200 back to the user. Mean 100 may employ a single component for both information input and output, for example, a touch-sensitive screen or other sensitive screen for use in electronic devices, equipped with a keyboard. The keyboard may have a QWERTY-based or other full-alphabet layout, a half-QWERTY layout, an alphanumeric keypad layout, or even a layout defined by the user. Alternatively, mean 100 may also use discrete components for respectively performing the input and output functions.

Processor 200 may include, but not limited to, a microprocessor, a programmable logic device, an integrated circuit chip or other similar device. Processor 200 is configured to process the user's input information transmitted from means 100 and to generate and feed an output signal to means 100. In addition, processor 200 may also interact with memory 300, including obtaining data from memory 300 and writing or updating data therein.

Memory 300 may store: basic programs for routine operations of the electronic device such as an operating system and software; computer instructions for executing the embodiments of the method of the present invention described below; word-related information for use in the embodiments of the method of the present invention. The word-related information may include words, information about associations between the words and their related words, use frequencies of the words and other data. As used herein and hereafter, a word of a language to which the text being input belongs is intended to refer to a sequence consisting of one or more smallest recognized elements of the language and associated with a certain meaning or pronunciation, for example, a word of one or more letters of English, French, German or other alphabetic languages or a single character or phrase of Chinese, Korean, Japanese or other non-alphabetic languages.

The electronic device may be implemented as any electronic device allowing text input based on a sensitive screen, including but not limited to, touch-screen mobile phones, touch-screen computers and touch-screen e-books.

Figure 3:
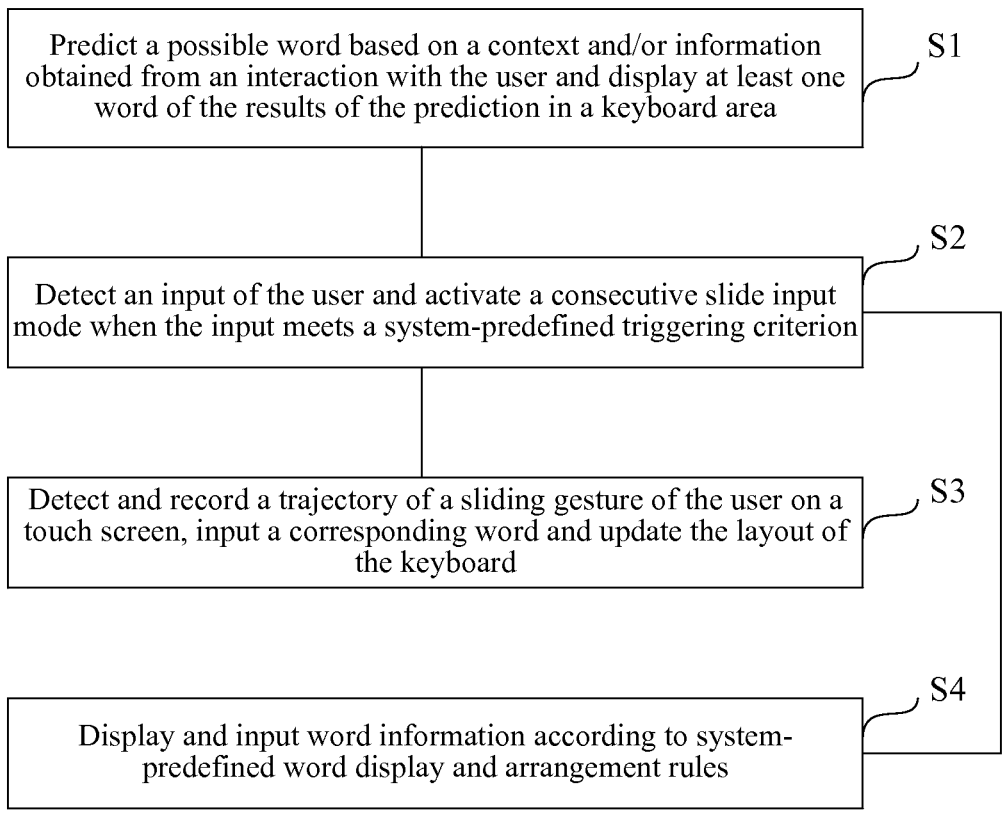
FIG. 3 depicts a flowchart graphically illustrating an embodiment of the method of the present invention.

Referring to FIG. 3, an embodiment of the method of the present invention used in the aforesaid electronic device may at least include the steps of:

(S1) predicting a possible word based on a context and/or information obtained from an interaction with the user and displaying at least one word of the results of the prediction in a key area of a keyboard;

(S2) detecting an input of the user, activating a consecutive slide input mode when the input meets a system-predefined triggering criterion, and proceeding to step S3; and (S3) detecting and recording a sliding trajectory of the user on a touch screen, inputting a corresponding word and updating the layout of the keyboard.

It is noted that the collection of these steps is provided merely as a preferred embodiment of the present invention, and that any separation or combination of them is considered with no impact on the conception of the invention. In other embodiments, the method may further include one or more steps prior to or after those described above to provide additional technical features.

For example, the method may also include: (S4) in the event of the user's input not meeting the criterion, displaying and inputting word information only according to system-predefined word display and arrangement rules.

Alternatively, another embodiment of the method of the invention used in the electronic device may include the steps of: (S11) detecting an input of the user, activating the consecutive slide input mode when the user's input meets the triggering criterion, and proceeding to step S12; (S12) detecting and recording a sliding trajectory of the user on the touch screen and obtaining a corresponding word; and (S13) predicting a possible word based both on the context and an input of the user and updating the keyboard layout according to at least one of the prediction results.

Still alternatively, in another embodiment of the invention, the method may include: (S111) predicting possible next words based on a context and/or information obtained from an interaction with the user and displaying at least one of the words in the keyboard area; (S112) detecting an input of the user and activating the consecutive slide input mode when the input meets the triggering criterion; (S113) detecting and recording a sliding trajectory of the user on the touch screen and, when the trajectory enters or approaches a system-predefined effective region associated with a displayed word, inputting the word in a text area; (S114) predicting possible next words based on a new context and/or a word just having been input and displaying at least one of the words in the keyboard area; and (S115) repeating steps S113 and S114 and exiting the consecutive slide input mode until a system-predefined exit criterion is met.

The inventive method will be described in greater detail below with reference to exemplary embodiments and the drawing pertaining thereto.

The method is initiated with at least one letter input by the user in any possible manner through means 100. The input information then serves as the basis for predicting a possible word, and at least one of the results of the prediction is subsequently displayed in the key area of the keyboard.

The possible word prediction may at least include: predicting a current possible word being input by the user; and predicting a next possible word to be input by the user.

In one specific embodiment, the current word prediction includes predicting the word when part, but not all, of its letters, has been input. For example, upon the user having input "wh", "what", "who", "where", etc. may be predicted as candidates of the possible word currently being input.

In another specific embodiment, the current word prediction may further include: predicting a related word of the current word, wherein the related word may be a word syntactically or semantically related to the current word. Specifically, for instance, in response to "request" having being input by the user, words with syntactic or semantic relevance to the word "require", such as its forms in different tenses, synonyms, antonyms and its forms in different parts of speech, for example, "required", "requires", "demand", "answer" and "requirement", may be predicted as candidates of the current word. In another instance, after the user has input "smart", words syntactically or semantically related to the word "smart", such as its comparative degree form, superlative form, synonyms, antonyms and its forms in different parts of speech will be predicted as candidates, for example, "smarter", "smartest", "wise", "dull" and "smartly". In still another instance, responding to "mouse" having been input by the user, words syntactically or semantically related to the word "mouse", such as its plural form, synonyms and its possessive form will be predicted, for example, "mice", "rat" and "mouse's".

In still another specific embodiment, the current word prediction may further include: correcting a current input of the user and predicting the current word based on the results of the correction. Specifically, when there is an accidental mistake in the user's current input or a spelling mistake in a word constituted by letters that have been input by the user, for example, "car" mistakenly input as "csr" due to pressing of a wrong key or "conference" misspelled as "confarence", a correction of the user's current input will be conducted first and the prediction of the current possible word will be performed based on the results of the correction.

In one specific embodiment, the next word prediction may include: when letters input by the user have come to constitute a complete word, predicting the next word based on a default one of the results of the prediction of the current word. For example, when the user has input "what", the word "what" may be taken as a default result of the predicted candidates "what", "whatever", "whatsit", "whatsoever"

and "wheat", and "can", "do", "is" and "to" may be predicted as the candidates of the next word.

In another specific embodiment, the next word prediction may further include: when the user has input and selected a word, predicting the next word based on the selected word. For example, upon the user having input and selected the word "how", "are", "do" and "can" will be predicted as the candidates of the next word.

In other embodiments, the possible word prediction may include predicting only the current word, or only the next word, or both current and next words.

Additionally, the possible word prediction may further include: predicting the current word, or one next word, or several next words.

The possible word prediction must take into account the context, and the prediction results may change with the context. For instances, in case of a previously input word "yesterday", when the user has input "it", the next word prediction results may be "was", "did" and the like, and in case of a previously input word "now", in response to "it" input by the user, the results may alternatively be "is", "does" and the like; and in case of a previously input word "I", when the user has input "s", the current word prediction results may be "see", "sing", "sleep" and the like, and in case of previously input words "I played", in response to "s" input by the user, the results may alternatively be "some", "skating" and the like. Further, the possible word prediction may also take into account one or more of word use frequency, the user's input preference, linguistic models, syntax rules and other relevant statistical information.

With the prediction results having been obtained, at least one word of the results is displayed in the key area of the keyboard. The prediction results may be a single word or a combination of several words. In specific implementations, the prediction results may also be empty, i.e., not including any word. In this case, nothing about the prediction results will be displayed in the key area. In specific embodiments, the event of the prediction results being empty may also be associated with an indication in the form of visual or auditory indication or vibration.

In one embodiment, the display of the at least one word of the prediction results is accomplished in a manner that is distinct from the conventional methods. In the conventional methods, candidate words are displayed in an area located away from the key area of the keyboard. This requires the user to move both the operating instrument for input or selection and the line of sight to move forth and back between the key area and the candidate-word area throughout the whole input process. For example, the user's line of sight needs to stay on the key area so as to facilitate the operating instrument to touch one or more keys in the area. However, when to select a candidate word, the user has to move both the line of sight and operating instrument to the candidate-word area to fulfill the selection task. This approach leads to great reduction in the input efficiency. In addition, as it requires the user to switch between operations in the key and candidate-word areas, it also results in an increase in the operating complexity and tends to get the user tired.

In light of this, the inventors of the present invention have developed word display and arrangement rules to process the prediction results such that at least one word of the processed results is directly displayed in the key area. This eliminates the need for moving the line of sight and operating instrument forth and back between the key and candidate-word areas and allows the user to do input and word selection directly in the same key area, thereby achieving more rapid and smooth text input, significantly increasing the input efficiency, relieving the user's fatigue caused by moving the line of sight and operating instrument forth and back, and providing the user with a more comfortable inputting experience.

Figure 4:
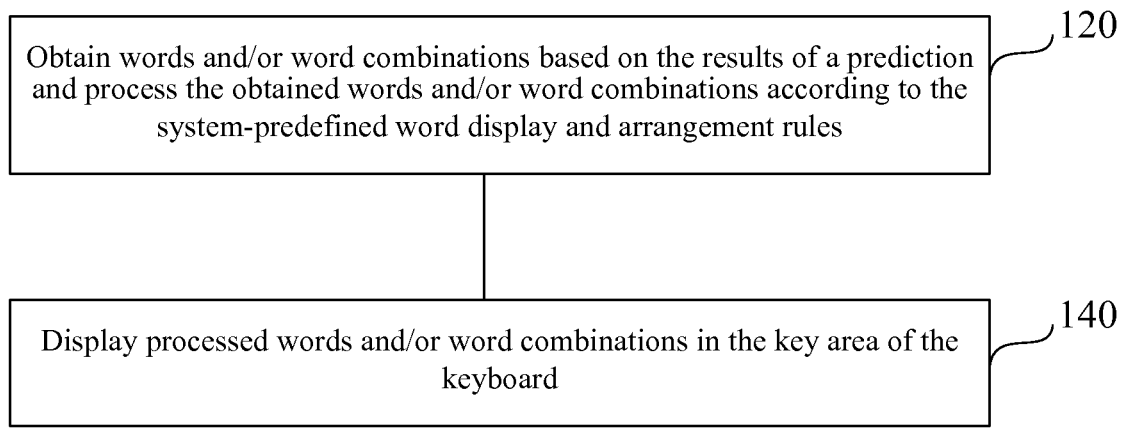
FIG. 4 is a flow chart illustrating an embodiment of step S1 of the method of the present invention of FIG. 3.

Specifically, referring to FIG. 4, one embodiment of displaying the at least one word of the processed results in the key area of the keyboard may include:

(120) obtaining words and/or word combinations based on the prediction results and processing the obtained words and/or word combinations according to the system-predefined rules; and (140) displaying the processed words and/or word combinations in the key area of the keyboard.

Figure 5:
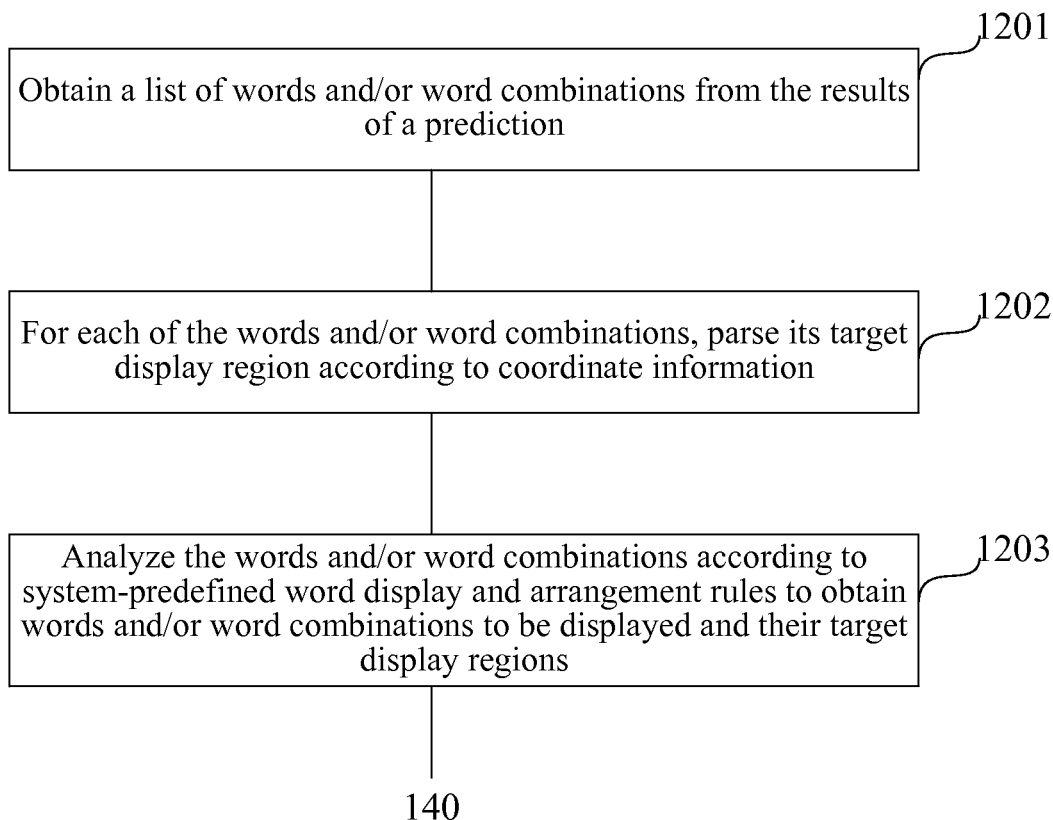
FIG. 5 is a flow chart illustrating an embodiment of step 120 of FIG. 4.

In specific embodiments, referring to FIG. 5, obtaining the words and/or word combinations from the prediction results and processing the obtained words and/or word combinations according to the system-predefined rules may further include the steps of:

(1201) obtaining a list of words and/or word combinations;

(1202) for each of the words and/or word combinations, parsing its target display region according to their coordinate information;

(1203) analyzing the words and/or word combinations according to the system-predefined rules to obtain words and/or word combinations to be displayed and their target display regions, wherein if a word and/or word combination satisfies the system-predefined rules, it is displayed in step (140) in a predetermined region of a key in the key area associated therewith; otherwise, a rearrangement mode is activated to recreate a list of displayable words and/or word combinations, followed by the display of the rearranged words and/or word combinations in predetermined regions of respective keys associated therewith in step (140).

More specifically, the word display and arrangement rules may at least include one or a combination of: (i) letter correspondence-based display; (ii) inter-word distance or word length-based display; (iii) touch point position or trajectory-based display; and (iv) word use frequency, user input preference, linguistic models, syntax rules, context and other relevant statistical information-based display.

In one specific embodiment of the present invention, the letter correspondence may include first letter correspondence. More specifically, the first letter correspondence-based display may include, but not limited to, if a word or word combination belongs to an alphabetic language, displaying it in a predetermined region of a key corresponding to its first letter, or else, if the word or word combination belongs to a non-alphabetic language, displaying it in a predetermined region of a key corresponding to its first phonetic alphabet. For example, the word "morning" is displayed at the location of the key "m", and "天气" at the location of the key "T".

In one specific embodiment of the present invention, the letter correspondence may further include correspondence to a next letter to be input by the user. The next letter correspondence-based display may include, but not limited to, if a word or word combination belongs to an alphabetic language, displaying its candidates in predetermined regions of keys corresponding to candidates of the next letter predicted based on letters that have been input and on the word or word combination itself, or else, if the word or word combination belongs to a non-alphabetic language, predicting candidates of a next phonetic alphabet to be input based on an analysis performed on phonetic alphabets that have been input as well as the word or word combination itself according to the language of the text being input and displaying candidates of the word or word combination in predetermined regions of keys corresponding to the candidates of the next phonetic alphabet. For example, if the text being input in French, upon "jab" have been input, the predicted candidate word "jabiru" will be displayed in a predetermined region of the possible next key "i", "jable" in a predetermined region of the possible next key "l", and "jabot" in a predetermined region of "o".

When the user is performing an operation in the keyboard area of the touch screen with a finger or an input instrument like a stylus, before the finger or input instrument is lifted off, there will be inevitably a blind area in the user's angular field of view around the location where the finger or an input instrument contacts the screen. Therefore, irregularly scattering the obtained words and/or word combinations in the key area of the keyboard will cause visual confusion and make the user have no idea of what to do next, and in worse cases, unable to perform subsequent operations. On the other hand, the irregular scattering may unintentionally activate an undesired word, which may cause an operation fault, when the user is making a sliding trajectory from one word to another.

In order to provide better operating experience and a more convenient input approach, the display and arrangement of the words and/or word combinations in the key area according to the present invention takes into account multiple factors, including the number, positional relationships and lengths of the displayed words and/or word combinations, a position of a touch point and a sliding trajectory, thereby achieving reasonable presentation of words that are possibly desired by the user and allowing the user to consecutively input multiple words, a whole sentence, or even a paragraph of text based on a continuous sliding trajectory.

In one specific embodiment of the present invention, the inter-word distance or word length-based display may include, but not limited to: if the parsed display regions of at least two of the words and/or word combinations are excessively close to each other, for each of the words and/or word combinations, determining, according to its priority level, whether to display it or not, such that, for example, only a word and/or word combination with a highest priority level is displayed, and the display region of each word and/or word combination with a lower priority level is changed; and if a length of a word and/or word combination affects the display of another word and/or word combination with an adjacent display region, determining according to their priority levels whether the word and/or word combination is displayed or whether its display region is to be changed.

In one specific embodiment of the present invention, the touch point position or trajectory-based display may include, but not limited to: if the parsed target display region of a word and/or word combination is determined to be blocked by a current touch point, not displaying the word and/or word combination or adjusting its display region; if the parsed target display regions of at least two words and/or word combinations are to be overlapped or blocked by a trajectory associated with the current touch point, for each of the words and/or word combinations, determining, according to its priority level, whether to display it or not, or whether to adjust its display region to make the region not to be overlapped or blocked by a possible subsequent extension of the trajectory.

Figure 6:
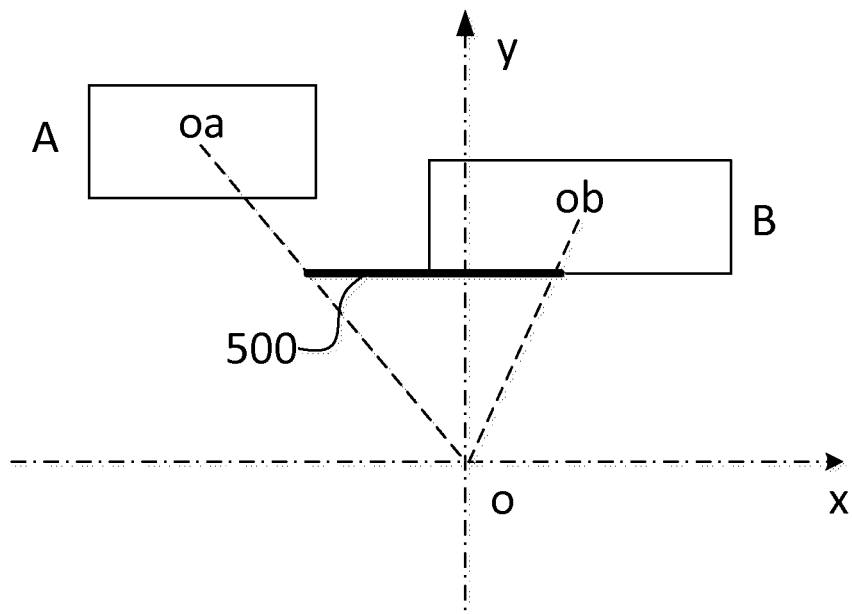
FIGS. 6 and 7 schematically illustrate an embodiment of touch point position and trajectory based display.
Figure 7:
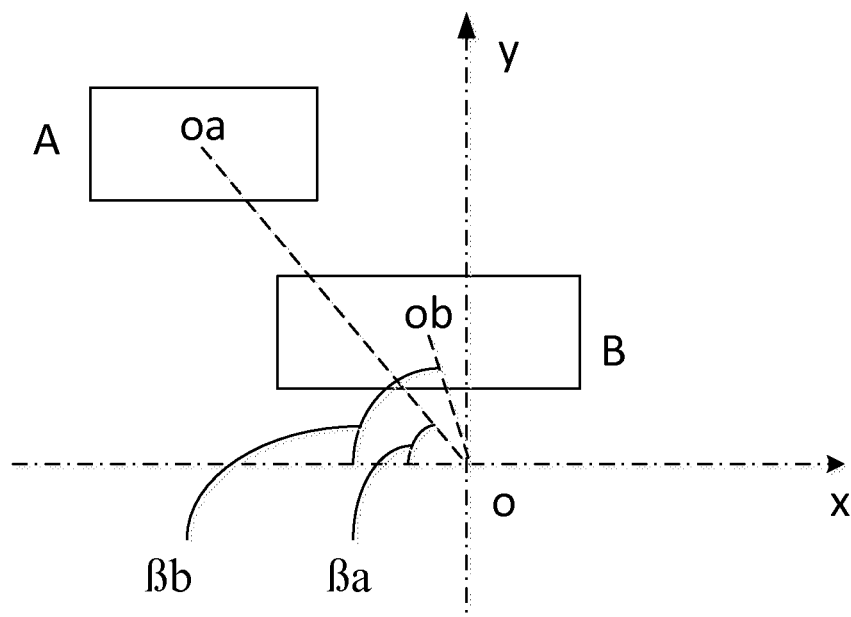

More specifically, in the embodiment shown in FIGS. 6 and 7, a display region A of a word A and a display region B of a word B are both located in a coordinate system centered at the position of a touch point O and have their sides parallel to the x and y axes. While these regions are illustrated and described as rectangles herein as an example and for simplicity, they can assume any shape suitable to be implemented, such as rectangular, square, round, oval, etc. In addition, according to practical needs, the display regions may have different shapes or sizes. Further, the size of a display region may be determined by a parameter of the word, for example its length.

The process may begin with the ascertainment of whether there is overlap between regions A and B. If true, it is known that words A and B will be unrecognizable to the user due to their partial or entire overlapping. Otherwise, the process proceeds to determine, after words A and B are displayed in the display regions, whether the user's selection of word A will conflict with the selection of word B.

Afterward, a calculation may be performed to obtain positions of regions A and B relative to the touch point. When regions A and B are located in different quadrants of the coordinate system centered at point O, they are considered not to cause such a conflict. In other words, in this case, after words A and B have appeared in their display regions in the key area, the selection of them will requires the user's motions from point O toward different directions, which will not cause any conflict. Otherwise, further effort is needed to find whether a conflict will occur due to the relative positional relationship between regions A and B. More specifically, it may be first ascertained that whether a center point oa of region A and a center point ob of region B are situated upper and lower than the x axis, and also on the right and left of the y axis, respectively, followed by calculation of a difference between a horizontal or vertical distance from points oa to O and half of a width or length of region A, as well as a difference between a horizontal or vertical distance from points ob to O and half of a width or length of region B. For example, if points oa and ob are on opposite sides of each of the axes x and y, concurrently with the horizontal and vertical distances between points oa and O being greater than halves of the width and length of region A, respectively, and also with the horizontal and vertical distances between points ob and O being greater than halves of the width and length of region A, respectively, regions A and B will be considered to reside on diagonally opposing quadrants of the coordinate system and not to cause a conflict. In addition, if points oa and ob are positioned on the same side of the axis x and opposite sides of the axis y, with the horizontal distance between points oa and O being greater than half of the width of region A and with the horizontal distance between points ob and O and half of the width of region B, regions A and B will be considered to be located in adjacent two quadrants on the same side of the axis y and also not to cause a conflict. Further, conditions for regions A and B to be located in adjacent two quadrants on the same side of the axis x may be determined in the same way.

If part or whole of region A is located in the same quadrant as part or whole of region B, further determination is needed.

For example, in this case, an interval between the regions can be compared with a predetermined non-conflicting distance threshold to determine whether a conflict will occur. Referring to FIG. 6, a length L indicated at 500 is compared to the predetermined non-conflicting distance threshold LT. If L>LT or L>=LT, then regions A and B are considered not mutually conflicting, and versa visa. The aforementioned interval may be the length L indicated at 500 in FIG. 6, or a linear, horizontal or vertical distance between the center points of regions A and B, or a linear, horizontal or vertical distance from any other point associated with region A or B to any other point associated with region B or A. The non-conflicting distance threshold may be a preset constant value, a user-defined constant value, or a variable which is a function of a variety of parameters such as a size or resolution of the touch-screen of the electronic device, use frequencies of candidate words and the context. In other embodiments, the user's input behaviors may be analyzed to determine the non-conflicting distance threshold as a dynamic value consistent with the user's input preference.

As a further example, an angle may be compared with a predetermined non-conflicting angle threshold to determine whether the regions are mutually conflicting. Referring to FIG. 7, a difference between angles βa and βb is compared to the predetermined non-conflicting angle threshold βT. For example, if the difference between angles βa and βb is greater than or equal to βT, then regions A and B will be considered not mutually conflicting, and versa visa. The angle compared to the threshold may be an angle delimited by a line segment between the touch point and any point associated with region A and a line segment between the touch point and any point associated with region B. The non-conflicting angle threshold may be set according to system parameters, or defined by the user, or a dynamic variable which is a function of various parameters such as a size or resolution of the touch-screen of the electronic device, use frequencies of candidate words, the context and the user's input preference.

Further, the determination of whether a conflict exists between regions A and B may also be accomplished by a combination of the foregoing interval-based and angle-based approaches, or by an alternative approach.

In one specific embodiment of the invention, display priority levels of the words/word combinations may be determined based on their use frequencies, the user's input preference, linguistic models, syntax rules, context and other relevant statistical information. This may include, but not limited to: more prioritized display of a word/or word combination: with a higher use frequency; more consistent with the user's input preference (e.g., previously input word groups, phrases and sentences may be memorized and selectively statistically analyzed, and those with a highest use frequency may be selected as ones preferred by the user and then compared with the the word/or word combination to determine the consistence); more consistent with the syntax rules; more consistent with the context or the other relevant statistical information.

In practical applications, the word display and arrangement rules may be selectively used or used in various combinations according to needs of the applications. For example, the rules may be one or more of: first letter correspondence based display above a letter key of the keyboard; inter-word distance or word length-based display; and touch point position or trajectory-based display.

Further, when the number of the rules is greater than two, they may also be prioritized to achieve a word display and arrangement approach more favorable to the user.

With the words and/or word combinations to be displayed and their display regions having been obtained, step (140) is performed. In specific embodiments, displaying the words and/or word combinations in the key area of the keyboard may be implemented as any of:

(1401) displaying them in their display regions in the key area of the keyboard; and (1402) displaying them in their display regions in the key area of the keyboard and also in a candidate-word area.

Specifically, displaying the words and/or word combinations in their display regions in the key area of the keyboard may be implemented as displaying them in predetermined regions of their respective associated keys. For example, each predetermined region may be located above, at the top left of, at the top right of, under, at the bottom left of or at the bottom right of the respective associated key, or at any position that is spaced apart therefrom by a distance not exceeding a system-predefined threshold.

In other embodiments, the results of the current word prediction may be displayed in the candidate-word area or a user-defined input area, with those of the next word prediction being displayed in the key area of the keyboard, in order to provide the user with an additional option. Once a default result of the current word prediction results is just the one desired by the user, the user may directly select any word and/or word combination of the next word prediction results, and the system may automatically combine the default result with the selected word and/or word combination and output them together, thus achieving a more rapid and convenient output approach.

Furthermore, displaying the at least one word of the processed results in the key area of the keyboard may further include: updating displayed content in the key area in a real-time fashion in response to an input of the user so as to closely associate the displayed content with the user's current input, thereby allowing the user to perform a subsequent operation based on the fed-back, displayed content and providing the user with more input conveniences. For example, when the user's current input has not yet constituted a complete word, in response to at least one letter subsequently input by the user, the possible word prediction may be done to update the displayed content in the key area by displaying at least one word of the prediction results therein.

Figure 8:
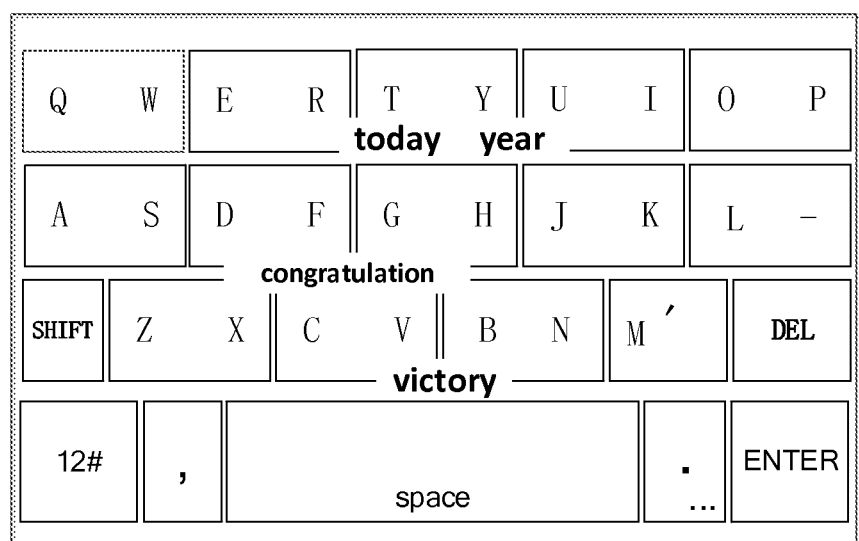
FIG. 8 is a schematic illustration of words arranged in a half-QWERTY keyboard in accordance with a specific embodiment of the present invention.
Figure 9:
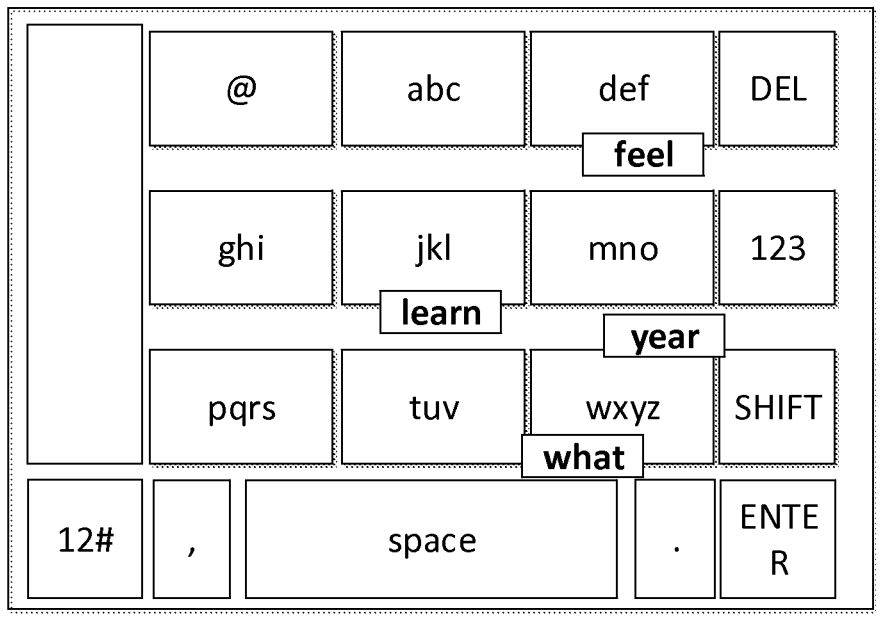
FIG. 9 is a schematic illustration of words arranged in an alphanumeric keypad in accordance with an embodiment of the present invention.

It will be appreciated by those skilled in the art that, the conception of the present invention is not limited to any specific keyboard layout. The aforementioned keyboard layout may be a QWERTY-based or other full-alphabet layout, a half-QWERTY layout, an alphanumeric keypad layout, or even a layout defined by the user. FIGS. 8 and 9 schematically show the display of predicted possible next words in key areas of a half-QWERTY keyboard and an alphanumeric keypad layout in accordance with respective embodiments of the present invention.

Figure 10:
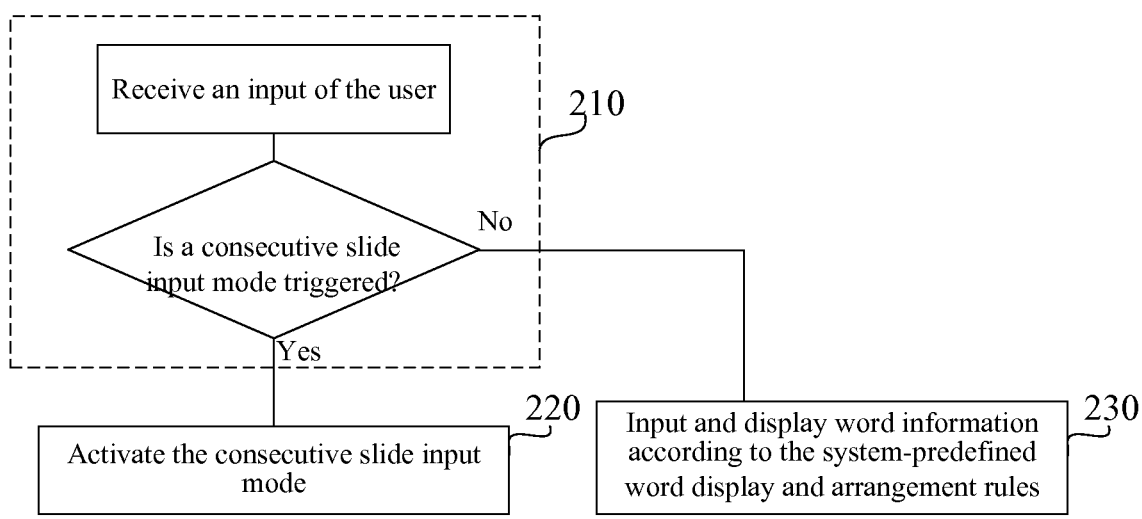
FIG. 10 is a flowchart graphically illustrating an embodiment of step S2 of the method of the present invention of FIG. 3.

After that, step S2 is performed to detect an input of the user and activate the consecutive slide input mode if the input meets a system-predefined triggering criterion. Referring to FIG. 10, in a specific embodiment of the present invention, step S2 may further include the steps of:

(210) receiving an input of the user and performing an analysis to determine whether a motion or event embodied in the user' input meets the system-predefined triggering criterion;

(220) if true, activating the consecutive slide input mode and proceeding to step S3; and (230) otherwise, performing step S4 to input and display word information according to the system-predefined word display and arrangement rules.

In one embodiment, the triggering criterion may include one or more of, and may further include one or more of substantial equivalents and various possible alternatives of:

(2101) a sliding trajectory starting from a space key;

(2102) a sliding trajectory starting from an arbitrarily designated key;

(2103) a sliding trajectory starting from a sensitive point located away from the key area;

(2104) a user-defined motion made around a displayed word, wherein the motion may be, for example, at least one or a combination of drawing a circle around the word, upward sliding, downward sliding, sliding to the left, sliding to the right, sliding along a predetermined direction from one side of the word to another side thereof, long pressing, drawing a predetermined pattern and dragging the word to a predetermined region, and wherein dragging the word to the predetermined region may include dragging the word to a region of the space key or of another designated key;

(2105) a predetermined motion made in an arbitrarily designated region, e.g., tapping, long pressing, drawing a predetermined pattern, sliding along a predetermined direction, etc., wherein the designated region may include a region of a displayed word or a region spaced apart from the word by a designated distance and may assume any designated shape, e.g., round, square, rectangular, oval, etc.;

(2106) a predetermined action taken on the electronic device, e.g., shaking the electronic device; and (2107) a sliding command input through other means, e.g., voice input means or optical, infrared or pressure sensing input means.

In addition, activating the consecutive slide input mode may further comprise performing a multimedia action to prompt the user to perform a subsequent operation, including an operation for triggering the consecutive slide input mode. For example the message "Slide here for selection" or "Slide to this point to start the consecutive slide input mode" may be displayed over the space key, or in the candidate-word area, or in another designated area to prompt the user to do what is being requested to perform the subsequent action. Additionally, another multimedia action may also be performed to notify the user that the consecutive slide input mode has been triggered. The multimedia actions may include one or more of:

(2111) generating a predefined sound or vibration;

(2112) highlighted display of possible next words;

(2113) zoomed displayed of possible next words;

(2114) display of possible next words in a different color; and (2115) display of indication information in a predetermined area of the keyboard, for example, over the space key or in the candidate-word area. The indication information may be implemented as text information, numeric information, image information, or any combination them.

After the consecutive slide input mode has been activated, step S3 is performed to input a corresponding word according to the user's sliding trajectory, followed by updating of the keyboard layout.

In one specific embodiment, inputting a corresponding word according to the user's sliding trajectory may include: detecting and recording the user's sliding trajectory on the touch screen, determining whether there is a corresponding word meeting a system-predefined word selection criterion, and inputting the word meeting the system-predefined word selection criterion to a text area.

The word selection criterion may include one or more of:

(310) a trajectory entering a system-predefined effective region associated with a displayed word and/or word combination;

(311) a sliding trajectory over a word and/or word combination; and (312) simultaneous multiple touch points.

In one specific embodiment, the effective region associated with the displayed word and/or word combination may include, but not limited to, a region where the word and/or word combination is displayed, or a region spaced apart from the word and/or word combination by a distance not exceeding a system-predefined distance threshold. In this case, upon the system having detecting the entry of the trajectory in the effective region, the corresponding word and/or word combination is determined as meeting the word selection criterion.

In one specific embodiment, item (311) may include: a sliding trajectory crossing the word and/or word combination from one side to another side. The two sides may be the same side or different sides.

Compared to the conventional input methods in which candidate words are arranged one by one and selected by taps, in the embodiments of the present invention, predicted words are displayed in the key area of the keyboard and thus allows selection by manipulating two-dimensional regions rather than the taps on one-dimensional points. This lowers the user' operating error rate and hence results in an improvement in both the text input accuracy and efficiency.

In another specific embodiment, item (311) may further include: selection of a related word of the word and/or word combination by a sliding trajectory. Specifically, this may include:

(3111) making a sliding trajectory from a region of the word/word combination to a predetermined region;

(3112) displaying related words, which may be words having syntactic or semantic relevance to the word/word combination, in vicinity of the predetermined region; and (3113) selecting a corresponding one of the related words, based on a specific operation of the user, and replacing the word/word combination with the selected one of the related words.

As an example, upon the user have made a sliding trajectory from a word and/or word combination to the space key region, related words of the word and/or word combination may be displayed around the space key, which may be words and/or word combinations syntactically or semantically related to the concerned word and/or word combination, such as, for example, its forms in different tenses, voices and/or parts of speech, singular or plural form, possessive form, synonyms and/or antonyms. After that, the user may continue the gesture to the right or left without the finger being lifted toward a desired one of the displayed words. Upon reaching the desired word, the user may select it by a predetermined operation, for example, maintaining the finger over the word for a predetermined time, making another gesture, or pressing another auxiliary key. Afterward, when the user further extends the sliding trajectory toward another word, the aforesaid word/word combination will be replaced by the selected related word. Additionally, the related words may also be displayed in the candidate-word area or another designated area. Further, when it has been determined based on the context or other factors that it is more reasonable to input a related word but not the aforesaid word/word combination, an event may be generated around the word/word combination, for example, display of an indication symbol, or highlighted or zoomed display, or display in another color, so as to provide an indication about this.

In one specific embodiment, item (312) may include: simultaneous pressing of the space key and a key over which the word/word combination is displayed.

Inputting the word meeting the system-predefined word selection criterion to the text area may be implemented as directly inputting the selected word around the location of a cursor in the text area, or as inputting the selected word in the user-defined input area, or as inputting the selected word in the user-defined input area and concurrently providing an indication around the cursor location in the text area. The user-defined input area may be a candidate-word area or another designated area, for example, an area located around the cursor location in the text area. In one specific embodiment, text that has been input in the user-defined input area may be transferred into the text area at the time when it is detected that the consecutive slide input mode has been exited or upon reception of a command for making this occur from the user.

In the consecutive slide input mode, with the user continuing the sliding trajectory, corresponding words may be successively selected and the displayed context in the key area of the keyboard may also be updated accordingly. In one specific embodiment, the updating of the keyboard layout may include: predicting a next possible word to be input based both on a context and on a current touch point of the user; and displaying at least one word of the results of the prediction in the key area of the keyboard.

Specifically, in the consecutive slide input mode, since all touch points are located within the key area, at various positions, though, it is required to take into account the user's current touch point during the process of displaying the at least one word of the results of the prediction in the key area of the keyboard, such that in the event of a change occurring in the current touch point, the display region of the at least one word will be recalculated and rearranged to still allow the user to select a subsequent word, i.e., performing consecutive text input. In addition, as there may have been some words displayed in the key area, additional considerations are needed to prevent a word to be subsequently displayed from conflicting with one or more of the ones having been displayed.

Figure 11:
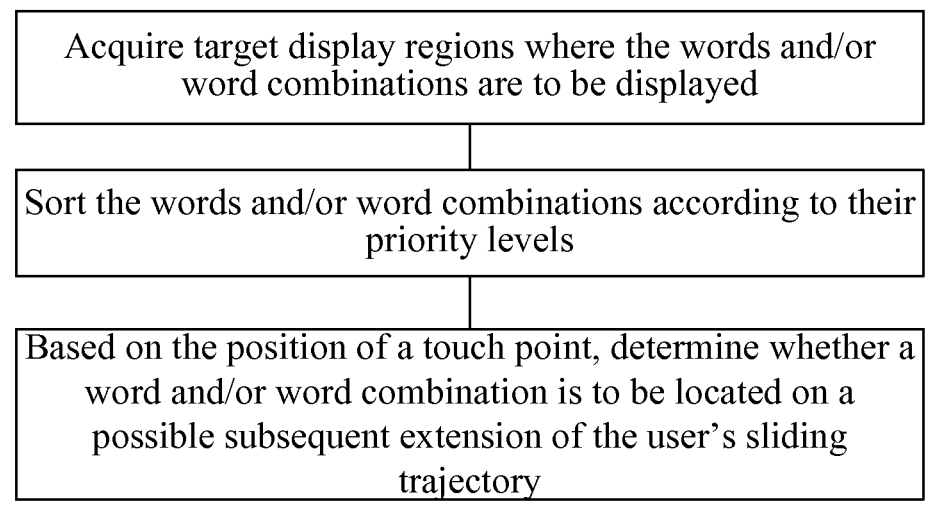
FIGS. 11 and 12 schematically illustrate different embodiments of updating the keyboard layout in the method of the present invention.

Referring to FIG. 11, in one embodiment, target display regions in the key area, of words and/or word combinations may be first acquired, for example, by arranging them according to their letter correspondence and then recording their coordinate positions. The words and/or word combinations may then be sorted according to their priority levels which may be obtained from the context and other factors. Next, for each of the words and/or word combinations, based on the position of a touch point, an analysis may be conducted to determine whether it will be located on a possible subsequent extension of the user's sliding trajectory. If there are at least two words and/or word combinations are determined to be overlapped or blocked thereby, only a word and/or word combination with a highest priority level may be displayed. In this process, the sorting and acquiring steps may also be implemented in a reverse order, or if a computing capacity allows, at the same time.

Figure 12:
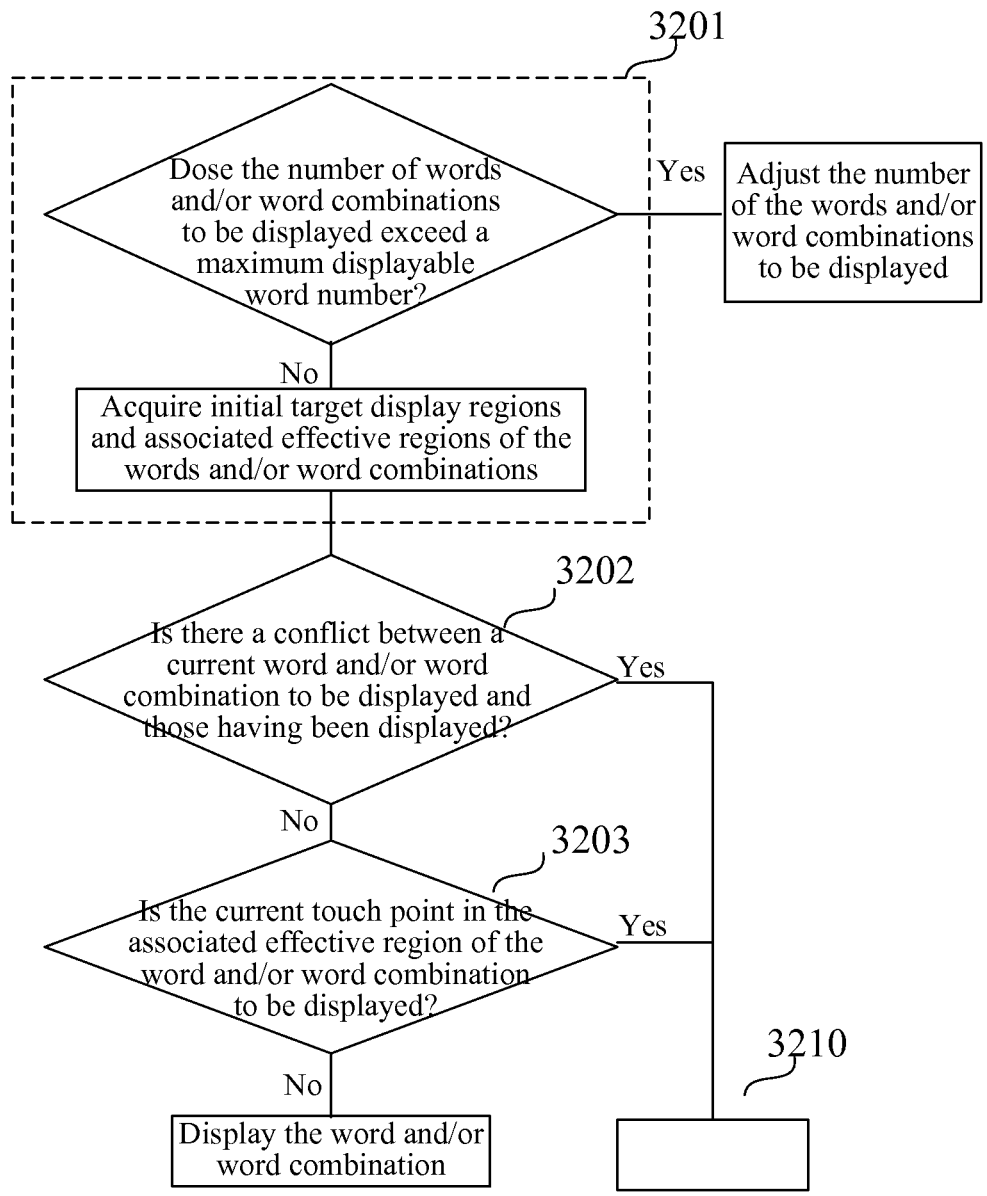

In a further embodiment, in the event of a temporarily stationary touch point, as shown in FIG. 12, step S3201 may be first performed to determine whether the number of words and/or word combinations whose target display regions have been acquired exceeds a maximum displayable word number. If true, the number of the words and/or word combinations may be adjusted. Otherwise, a subsequent step is performed. The maximum displayable word number may be configured, for example, according to a screen size, resolution, or practical needs. For example, when the maximum displayable word number is 10, only the first ten of the words and/or word combinations are displayed, while the remainder is not.

Figure 13:
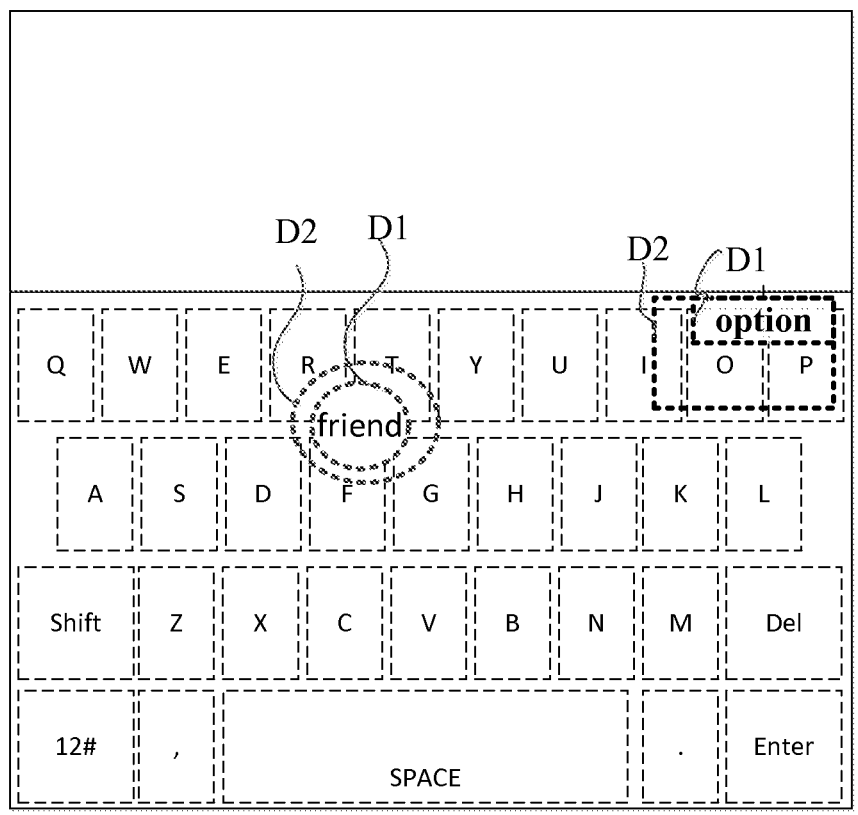
FIG. 13 schematically illustrates an embodiment of an effective region associated with a word and/or word combination in the method of the present invention.

Additionally, step S3201 may also include acquiring initial target display regions of the words and/or word combinations, for example, based on the above-described letter correspondence rule. As shown in FIG. 13, a default initial target display region of the word "how" may be located above its corresponding key "H".

Step S3201 may further include calculating effective regions associated with the respective words and/or word combinations. Referring to FIG. 13, each of the words or word combinations may be provided with an accurate-touch area D1 and a wrong-touch area D2. When a touch point is located within accurate-touch area D1, it may directly trigger the selection of a corresponding word displayed in this area. Wrong-touch area D2 is provided to prevent the user's wrong selection of undesired words possibly displayed in the area due to keyboard layout updating caused by the user who is making a sliding trajectory. Wrong-touch area D2 may be overlapped in part or in whole by accurate-touch area D1, or encompass accurate-touch area D1, or be adjustable according to its relative position to the keyboard. For example, when the wrong-touch area D2 is located around an edge of the keyboard, it may be partially overlapped by accurate-touch area D1 at a portion nearer to the keyboard edge while extending beyond accurate-touch area D1 at the other portions.

In step S3202, whether there is a conflict between a current word and/or word combination to be displayed and words and/or word combinations that have been displayed in the key area may be determined. If true, the process loops to step S3210 and, otherwise, to the next step.

In step S3203, whether the current touch point is situated within the effective region associated with the word and/or word combination to be displayed may be determined. For example, if the touch point is located apart from wrong-touch area D2 of the word and/or word combination, it is known that the display of the word and/or word combination will not be blocked by the touch point, and the word and/or word combination is accordingly displayed. The process then returns to the beginning of the step. Otherwise, if the touch point is within the wrong-touch area of the word and/or word combination, as it is thereby known that the display of the word and/or word combination will be blocked by the touch point or a wrong selection will occur which can confuse the user, the process loops to step S3210.

Step S3210 is performed to handle a word and/or word combination improper to be displayed immediately. In this step, for example, the display of the word and/or word combination may be cancelled, or alternatively, the word and/or word combination may be rearranged. The rearrangement may include, for example, incrementally moving the initial target display region of the word and/or word combination to other regions of the associated key thereof, and repeatedly performing the above-described corresponding determining step. If it becomes suitable to be displayed in the key area within a predetermined number of increments, it will be displayed. Otherwise, its display is cancelled.

In other embodiments, step S3 may further include: input word cancellation when a predetermined action is taken.

The predetermined action may include one or more of: (a) making a sliding trajectory from an area of the keyboard to the space key; (b) making a sliding trajectory from an area of the keyboard to a user-defined area; (c) and making a sliding trajectory beyond the keyboard.

The cancellation may be any of: (i) cancellation of only an immediately previously input word; (ii) cancellation of a user-defined number of previously input words; and (iii) cancellation of all previously input word.

In other embodiments, detecting and recording the user's sliding trajectory on the touch screen in step S3 may further include sliding trajectory display in at least one of the following manners: displaying the whole sliding trajectory;

or displaying only a portion of the sliding trajectory produced in an immediately previous user-defined time frame and causing it to gradually disappear from the screen when its display time has exceeded a user-defined threshold.

In other embodiments, inputting the corresponding word meeting the word selection criterion in step 3 in the text area may further include indicating the input of the word by at least one of: an animation event, for example, the word and/or word combination floating upward and then gradually vanishing; a vibration; and a sound.

Step S3 may be repeated until the satisfaction of a system-predefined criterion for triggering the exit of the consecutive slide input mode has been detected. The criterion may be, for example, the user terminating the touch, a sliding trajectory to a predetermined area, absence of a possible next word, or the user selecting a predetermined word.

As can be seen from the above description, according to the embodiments of the present invention, after the system has completed the input of a word in the text area, it is still available for detecting the user's continuation of the sliding trajectory, predicting possible next words and displaying them in the key area of the keyboard. As such, the user can successively input multiple words or even a whole sentence without the need to terminate the gesture. The present invention features the advantage of allowing input of multiple words or a whole sentence in each operation, over the conventional word-by-word input approaches.

Upon a failure in activating the consecutive slide input mode, step S4 is performed to display and input word information according to the system-predefined word display and arrangement rules. In one specific embodiment, displaying and inputting word information according to the system-predefined word display and arrangement rules may include arranging only words and/or word combinations obtained from a dictionary database in the key area of the keyboard according to the system-predefined word display and arrangement rules. Reference may be made to the above description for specific implementations of the display of the words and/or word combinations in the key area of the keyboard.

Figure 14:
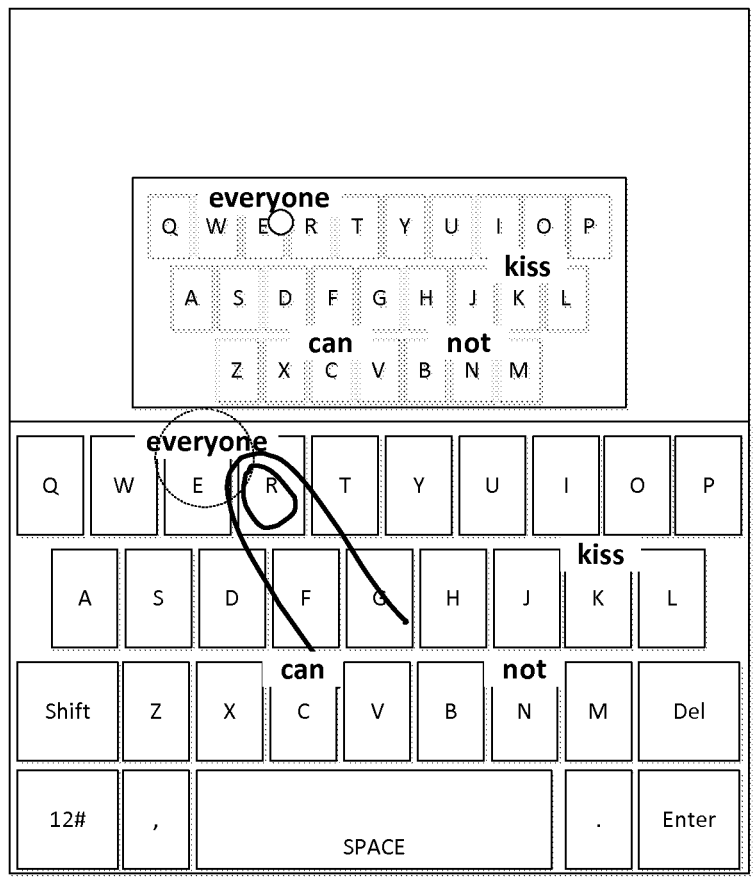
FIG. 14 schematically illustrates an embodiment of anti-blockage by keyboard duplication in the method of the present invention.
Figure 15:
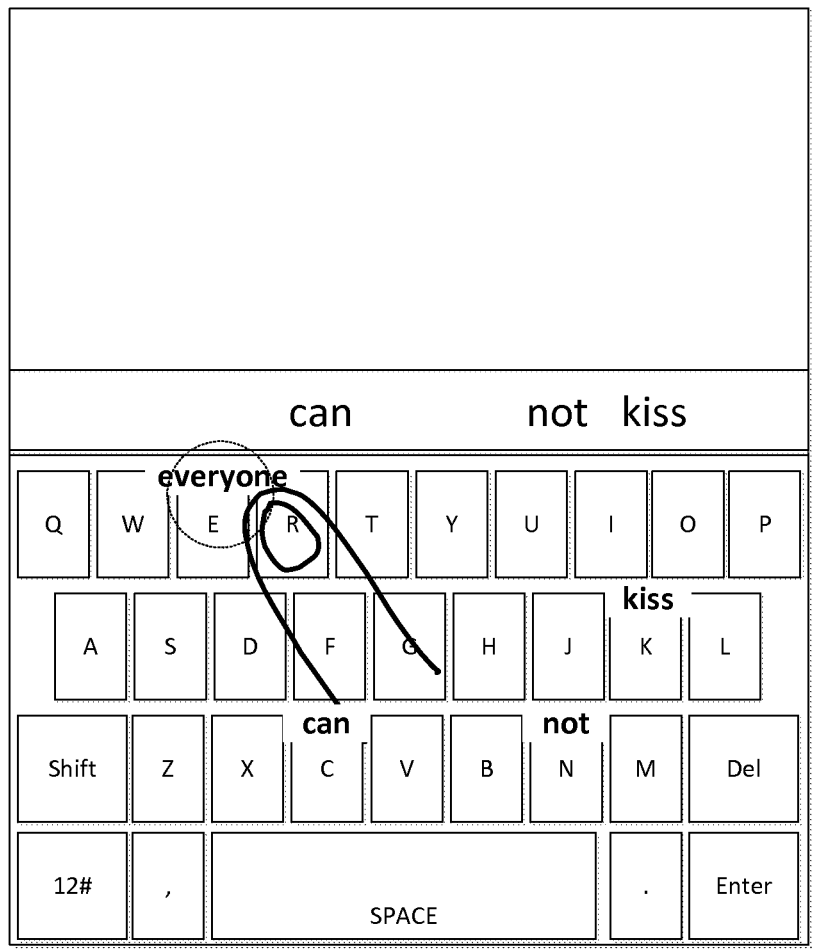
FIG. 15 schematically illustrates an embodiment of anti-blockage by word relocation in the method of the present invention.

In other embodiments, the method of the present invention may further include the steps of: during the user's continuous sliding trajectory based input, performing an anti-blockage treatment on word information displayed on the keyboard area. The treatment may include one or more of:

(610) referring to FIG. 14, keyboard duplication, specifically including: in the event of the finger sliding over a word in the key area of the keyboard and then staying thereon without being lifted for a duration exceeding a system-predefined time limit, displaying a reduced duplicate of the key area in vicinity thereof and providing the duplicate with an indicator that indicates the position of a current touch point of the finger;

(620) referring to FIG. 15, word relocation, specifically including: in the event of the finger sliding over a word in the key area and then staying thereon without being lifted for a duration exceeding a system-predefined time limit, updating the candidate-word area in the keyboard area such that all words in the key area are displayed in the candidate-word area, wherein the words are displayed in the updated candidate-word area along a certain direction with their vertical positions therein respectively corresponding to their original vertical positions in the key area, and wherein the selected word is not displayed in the candidate-word area; and (630) word rearrangement, specifically including: in the event of the finger sliding over a word in the key area and then staying thereon without being lifted for a duration exceeding a system-predefined time limit, in the course of words in the key area being updated, if a default target display region of a word is spaced from the touch point of the finger by a distance that is less than a system-predefined distance threshold, the word is displayed and arranged in a region located in vicinity of the touch point of the finger, specifically, above, left to or right thereto, and spaced therefrom by a distance greater than the system-predefined distance.

It shall be appreciated by those skilled in the art that the method of the present invention is not limited to any specific language. For example, the embodiments of the present invention may be applied to languages, including, but not limited to, one or more of: Chinese, English, Japanese, French, German, Italian, Korean, Spanish, Portuguese, Russian, Belgian, Dutch, Arabic, Cyrillic, Greek, Indonesian, Malay, Filipino, Albanian, Basque, Bosnian, Bulgarian, Catalan, Croatian, Czech, Danish, Estonian, Finnish, Galician, Hebrew, Hungarian, Icelandic, Lithuanian, Kazakh, Khmer, Laotian, Latvian, Macedonian, Malagasy, Maori, Marathi, Norwegian, Persian, Polish, Romanian, Serbian, Slovak, Slovenian, Swedish, Thai, Turkish, Uighur, Ukrainian and Vietnamese.

Figure 16:
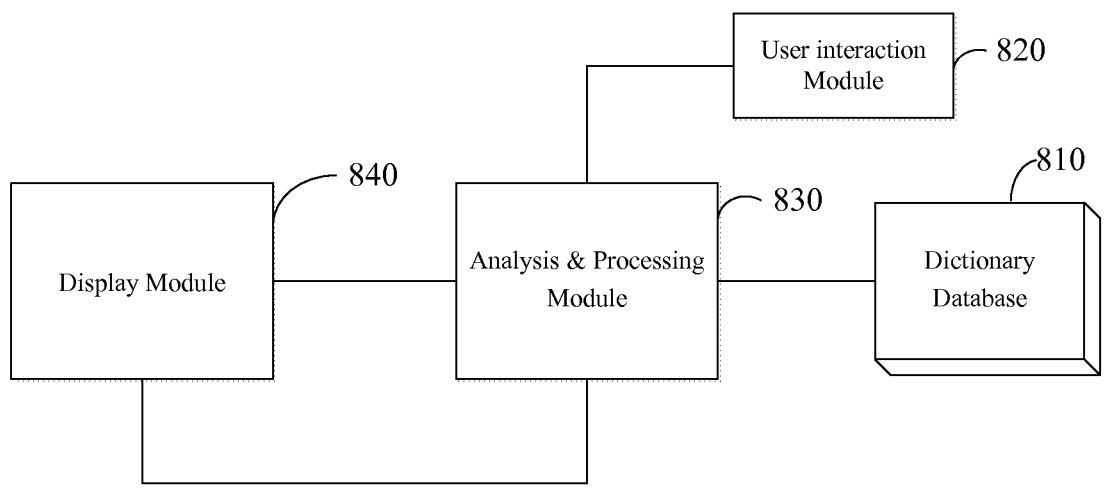
FIG. 16 is a schematic illustrating a system for continuous sliding trajectory based text input constructed in accordance with the present invention.

The present invention also provides a system for continuous sliding trajectory based text input. The system may be implemented either as a physical apparatus or as a functional module based on a software program. Referring to FIG. 16, in one specific embodiment, the system comprises: a dictionary database 810, adapted to store word information; user interaction module 820, adapted to process interactions with the user and record and transmit information input in the keyboard area to an analysis and processing module 830; analysis and processing module 830, adapted to receive the information and an event from the user interaction module, sort and process the information and event, interact with dictionary database 810 to obtain therefrom a list of words and/or word combinations according to certain selection rules, and pass the obtained list on to a display module 840; and display module 840, adapted to display and arrange the words and/or word combinations obtained from analysis and processing module 830 according to the system-defined word display and arrangement rules in the key area of the keyboard and feed information about the results of the display, including information about word number, positions and coordinates, back to the analysis and processing module.

Specifically, the information recorded by user interaction module 820 may include at least one of: (8201) a tapping, lifting or moving event occurring at a single touch point; (8202) a tapping, lifting or moving event occurring at multiple touch points; (8203) coordinate information; and (8204) a sliding trajectory.

The selection rules on which the analysis and processing module is based to obtain the list of words may include one or more of: word use frequency, context, the user's previous inputs, linguistic models, syntax rules and other relevant statistical information.

In one specific embodiment, analysis and processing module 830 is configured to perform the steps of:

(8301) receiving the information and event from user interaction module 820 and performing an analysis to ascertain whether the action or event meets a system-predefined criterion for triggering a consecutive slide input mode;

(8302) if true, performing the steps of:
  (i) transmitting information of a current touch point or trajectory to display module 840; and
  (ii) sending the words and/or word combinations obtained from dictionary database 810 to display module 840 which responsively updates words displayed on the keyboard layout;
(8303) otherwise, transmitting only the words obtained from dictionary database 810 to the display module 840 which responsively displays the words in the key area of the keyboard according to system-predefined word display and arrangement rules;
(8304) determining whether a word or word combination meets a system-predefined word selection criterion based on the information fed back from display module 840 in combination with a trajectory of a current moving or sliding trajectory of the user;
(8305) if true, detecting a sliding trajectory of the user, and transmitting a word confirmed by the user to an input area or directly causing it to be displayed around a cursor;
(8306) otherwise, producing no output;
(8307) repeating steps 8301 to 8306 until receiving a gesture termination event from user interaction module 820.

In one specific embodiment, display module 840 displays and arranges the words received from analysis and processing module 830 in the key area of the keyboard according to the system-predefined word display and arrangement rules, and feeds information about the results of the display, including information about word number, positions and coordinates, back to analysis and processing module 840. More specifically, to this end, display module 840 may perform the following steps:

(8401) receiving a list of words or word combinations transmitted from analysis and processing module 830;
(8402) for each of the words or word combinations, parsing its target display region according to its coordinate;
(8403) if a current word or word combination satisfies the system-predefined word display and arrangement rules, displaying it in a predetermined region of a key in the key area associated therewith;
(8404) otherwise, activating a rearrangement mode to screen the words that have not been displayed and thereby recreate a list of displayable words; and
(8405) transmitting information about the number of words and coordinates of the positions of the words back to analysis and processing module 830 after each rearrangement.

The predetermined region may be located above, at the top left of, at the top right of, under, at the bottom left of, or at the bottom right of the associated key, or at any position that is spaced apart from the associated key by a distance not exceeding a system-predefined distance threshold.

The word display and arrangement rules may include one or a combination of: (i) letter correspondence-based display of a word in a corresponding region in the key area; (ii) inter-word distance and word length-based display; (iii) touch point position and trajectory-based display; and (iv) word use frequency, user input preference, linguistic models, syntax rules, context and other relevant statistical information-based display.

The principles of the present invention will be readily apparent upon a reading of the following description of several examples.

Example 1

Figure 17A:
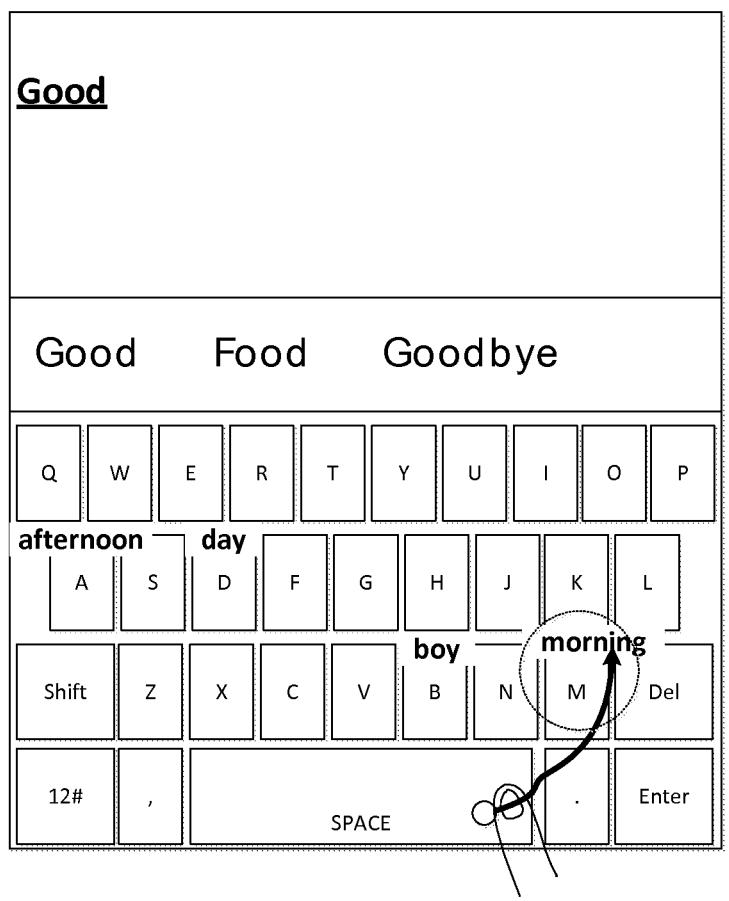
FIGS. 17 A, 17B, 17C and 17D are schematics illustrating user manipulation in a first example of the present invention.
Figure 17B:
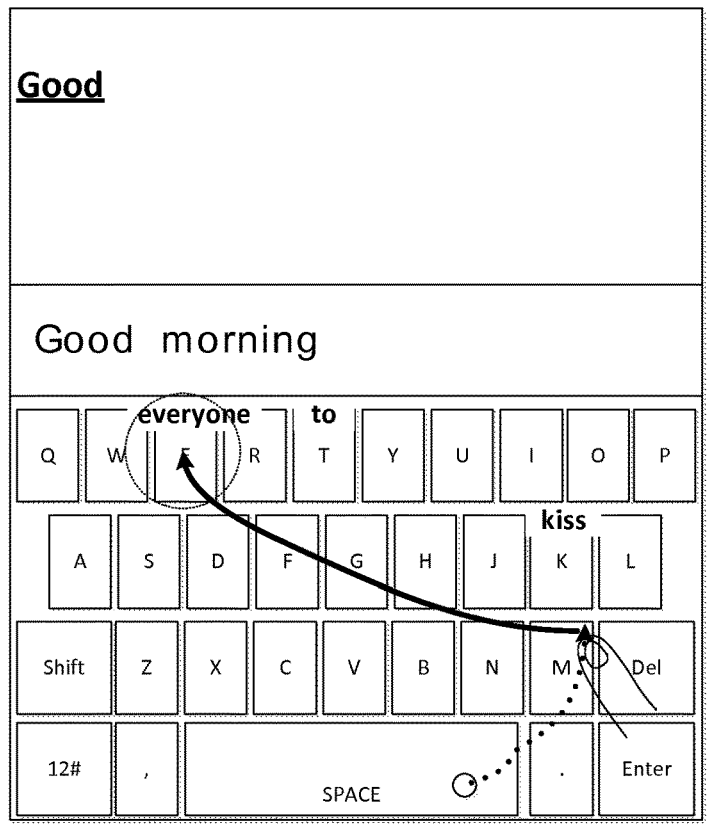
Figure 17C:
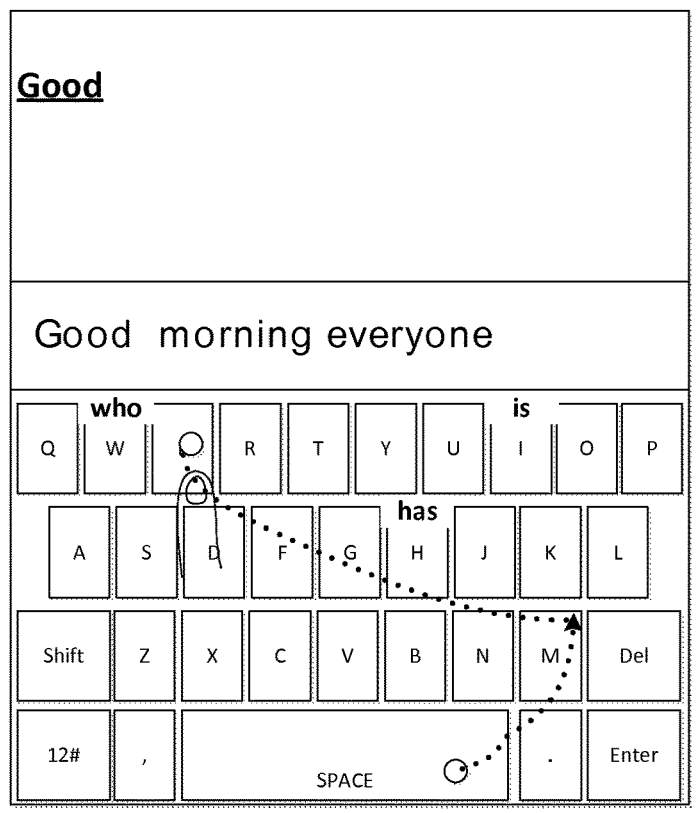
Figure 17D:
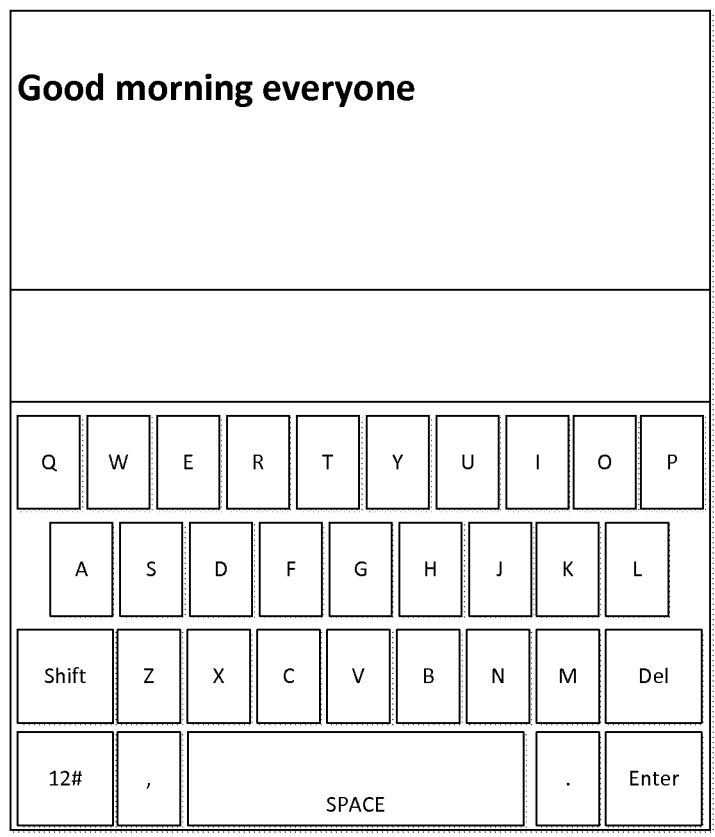

Referring to FIGS. 17A to 17D, a complete process of continuous word input initiated with a sliding trajectory starting from a space key includes the steps of:

(1) inputting the word "Good" by a tapping or sliding motion, thereby causing the display of related words of "Good", i.e., "morning", "day", "boy" and "afternoon", as shown in FIG. 17A, in the keyboard area according to the inventive rules;
(2) the finger sliding from the space key to an identification region of the word "morning", i.e., touching the space key and then moving to the location marked by the dashed-line circle in FIG. 17B, such that the word "morning" is selected and displayed in a candidate-word box, an area in which a word is temporarily held in a "standby" state before it is finally input in the text area;
(3) the word combination "Good morning" serving as the basis for predicting and electing several possible next words, shown as "everyone", "kiss" and "to" in FIG. 17B, the inventive rules-based display of which updates the displayed content on the keyboard;
(4) the finger continuing sliding forwardly to an identification region of the word "everyone", i.e., continuing moving to the location marked by the dashed-line circle in FIG. 17C with being lifted, such that the word "everyone" is selected and displayed in the candidate-word box;
(5) the word combination "Good morning everyone" again serving as the basis for the prediction and election of new possible next words, shown as "who", "has" and "is" in FIG. 17C, followed by another updating of the displayed content;
(6) the finger still being allowed to slide to other desired words to select them, i.e., repeating steps (2) to (5);
(7) the finger being lifted, i.e., the touch being terminated, which stops the input and thereby causes the transfer of the words in the candidate-word box to the text area, as shown in FIG. 17D.

Example 2

Figure 18A:
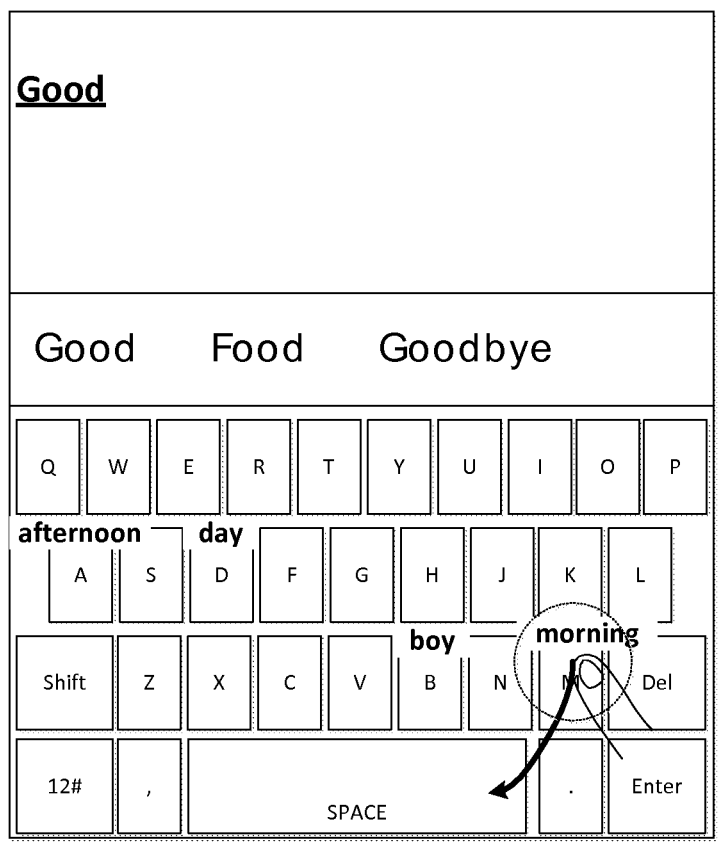
FIGS. 18A and 18B are schematics illustrating user manipulation in a second example of the present invention.
Figure 18B:
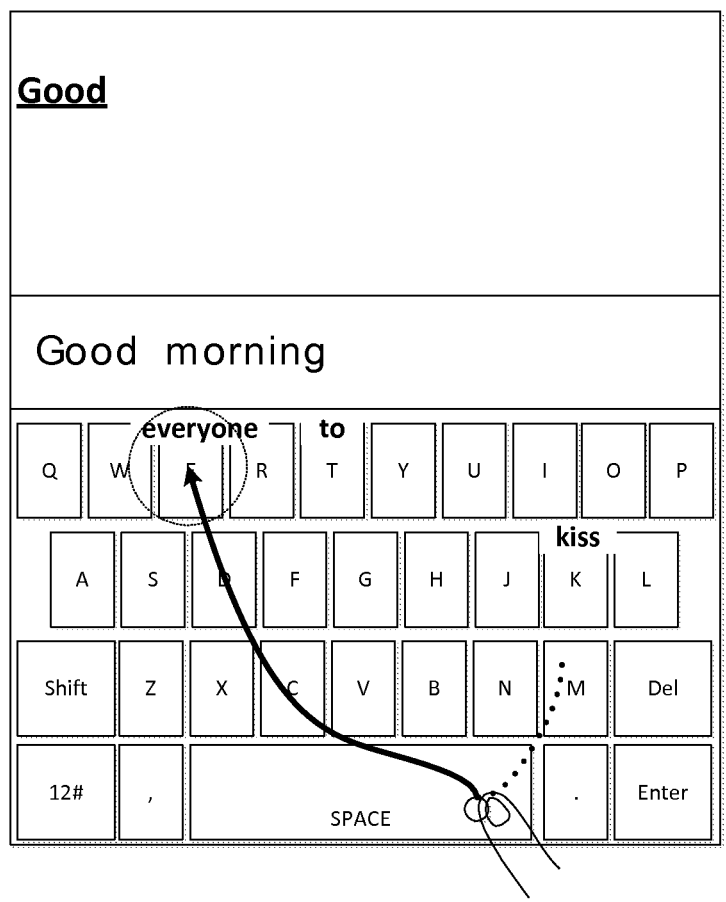

FIGS. 18A to 18B show a process for triggering the consecutive slide input mode by tapping a word displayed above a letter key and dragging it into a region of the space key. The process involves the following steps.

(1) At first, as shown in FIG. 18A, the consecutive slide input mode is triggered by tapping the screen within the identification region of the word "morning", i.e., the location marked by the dashed-line circle in the figure, and dragging the word to the region of the space key. This also causes the selection of the word "morning", which is then displayed in the candidate-word box.
(2) The word combination "Good morning" in the candidate-word box serves as the basis for predicting and selecting several possible next words, shown as "everyone", "kiss" and "to" in FIG. 18B, and the displayed content on the key-board is accordingly updated to these word.
(3) If the user's sliding trajectory is not terminated and is further extended to the identification region of the word "everyone", i.e., the location marked by the dashed-line circle in FIG. 18B, the word "everyone" will be selected and displayed in the candidate-word box. Before the gesture is terminated, further desired words can be input by repeating steps (2) to (3).
(4) Otherwise, if the touch is terminated after step (2), in order to further input the word "everyone", it is required to perform again step (1) to tap the word "everyone" and drag it into the region of the space key.

Example 3

The consecutive slide input mode is triggered by one of several actions taken around a word displayed above a letter key, including:

(1) drawing a circle or any other predetermined pattern, for example, a triangle, cross or tick, which will cause the selection of the words, as well as its display in the candidate-word box, and after which, the word is transferred to the text area if the touch is terminated, or another word in the updated content is subsequently selected if the gesture is continued to its identification region;

(2) upward or downward sliding, or sliding to left or right, which will cause the selection of the words, as well as its display in the candidate-word box, and after which, the word is transferred to the text area if the touch is terminated, or another word in the updated content is subsequently selected if the gesture is continued to its identification region;

(3) a forth-and-back sliding motion, for example, a left-right-left motion or such a motion made along any direction, which passes through the region where the word is displayed twice; and (4) a user-defined motion, e.g., a certain gesture.

Example 4

Figure 19:
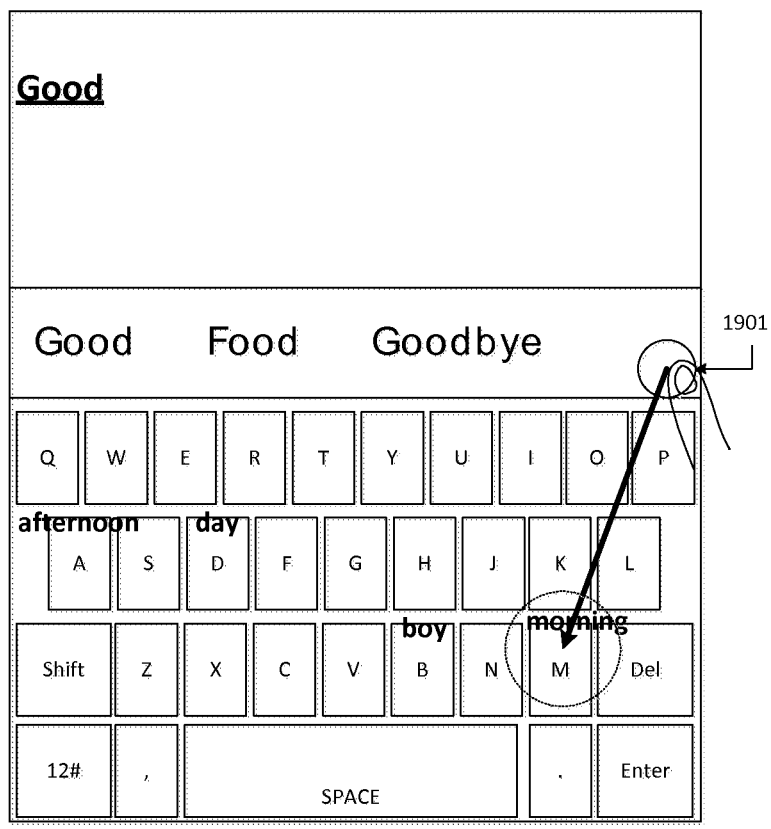
FIG. 19 is a schematic illustrating user manipulation in a fourth example of the present invention.

Referring to FIG. 19, the consecutive slide input mode is triggered by a sliding trajectory starting from a user-defined sensitive point 1901 in the keyboard to a word displayed around a letter key.

Example 5

Figure 20:
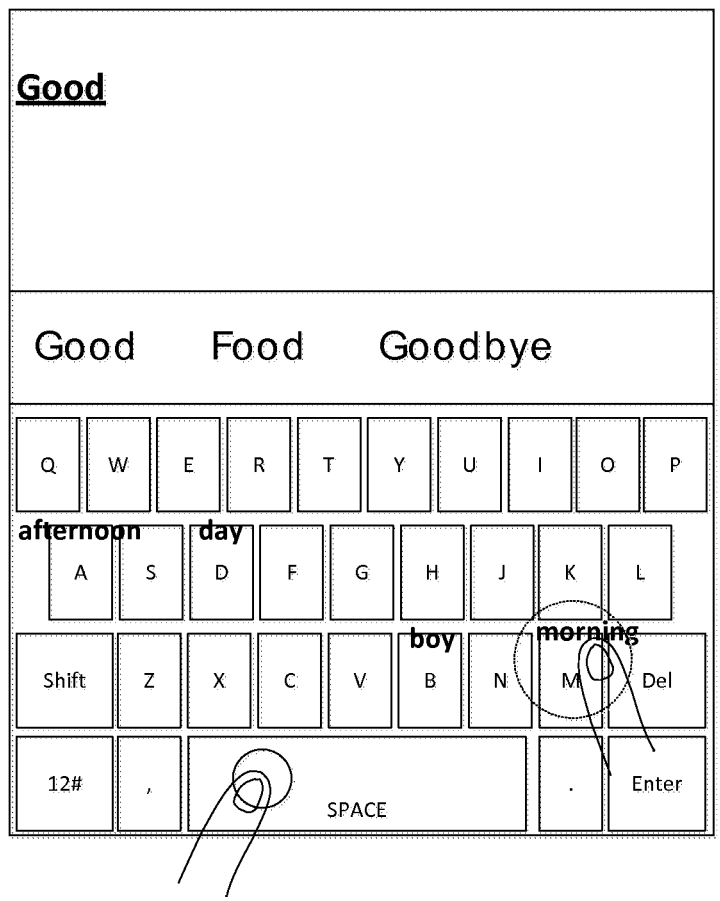
FIG. 20 is a schematic illustrating user manipulation in a fifth example of the present invention.

With the space key or another user-defined key being touch, a word displayed around a letter key is input to the text area by simply tapping it. Successive input of other words is possible by repeating this operation, as shown in FIG. 20.

Example 6

Referring to FIGS. 21A to 21D, in response to at least one letter arbitrarily input by the user, prediction of possible next words and/or word combinations is performed by the system and the key area of the keyboard is updated in a real-time fashion with the predicted words.

Figure 21A:
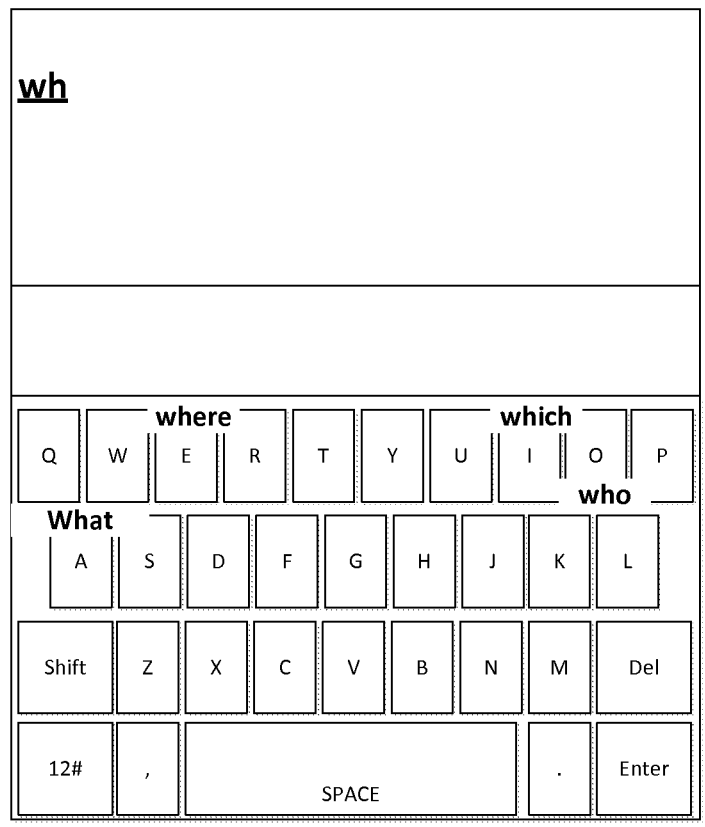
FIGS. 21A, 21B, 21C, 21D, 21E and 21F are schematics illustrating user manipulation in a sixth example of the present invention.

(1) Upon the user having input "wh", words associated with these input letter, such as "who", "what", "where" and "which", as shown in FIG. 21A, are displayed in the key area according to the inventive rules.

Figure 21B:
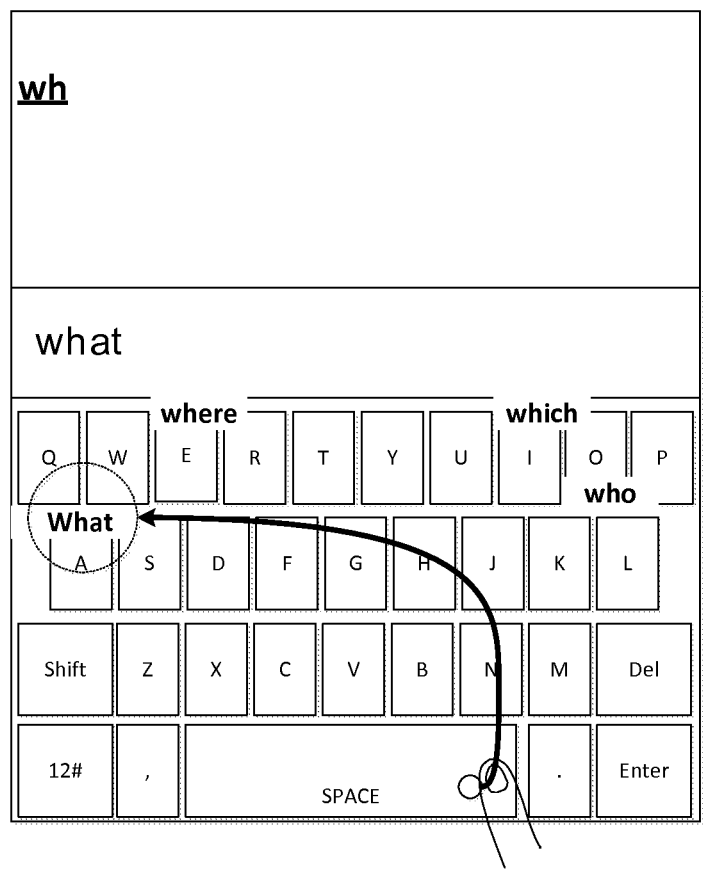

(2) The word "what" is selected, and the consecutive slide input mode is concurrently triggered, when the finger makes a sliding trajectory from the space key and upward into the identification region of "what", as shown in FIG. 21B. More specifically, the finger taps the space key and then slides to the location marked by the dashed-line circle, thereby causing the selection of the "what" and its display in the candidate-word box. At the same time, the consecutive slide input mode is triggered, allowing input of subsequent words by continuously extending the sliding trajectory with the finger being lifted off the screen.

Figure 21C:
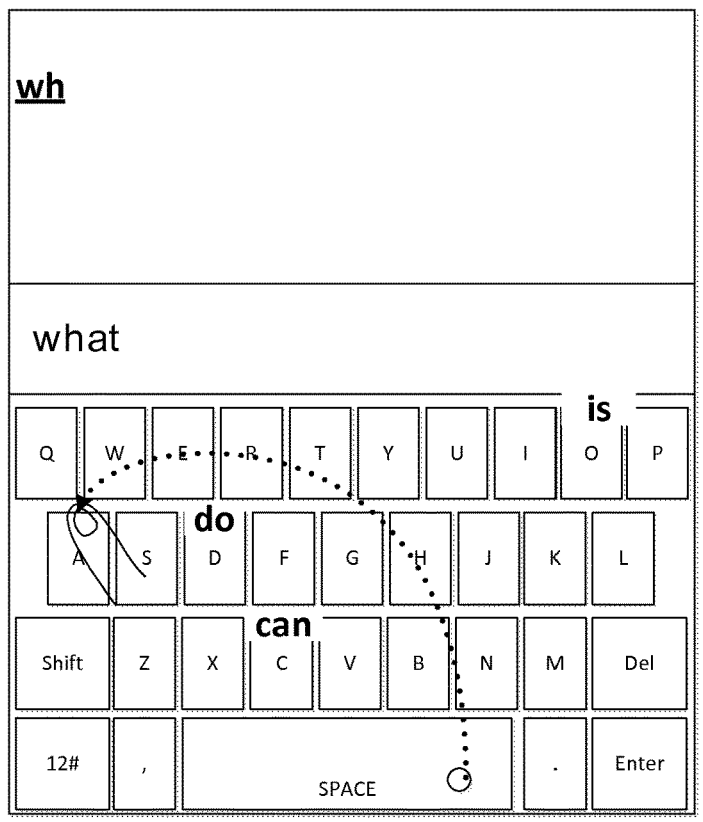

(3) Associated words of the "what" in the candidate-word box, shown in as "can", "is" and "do" in FIG. 21C, are then predicted based thereon and displayed according to the inventive rules to replace the word currently being presented in the key area.

Figure 21D:
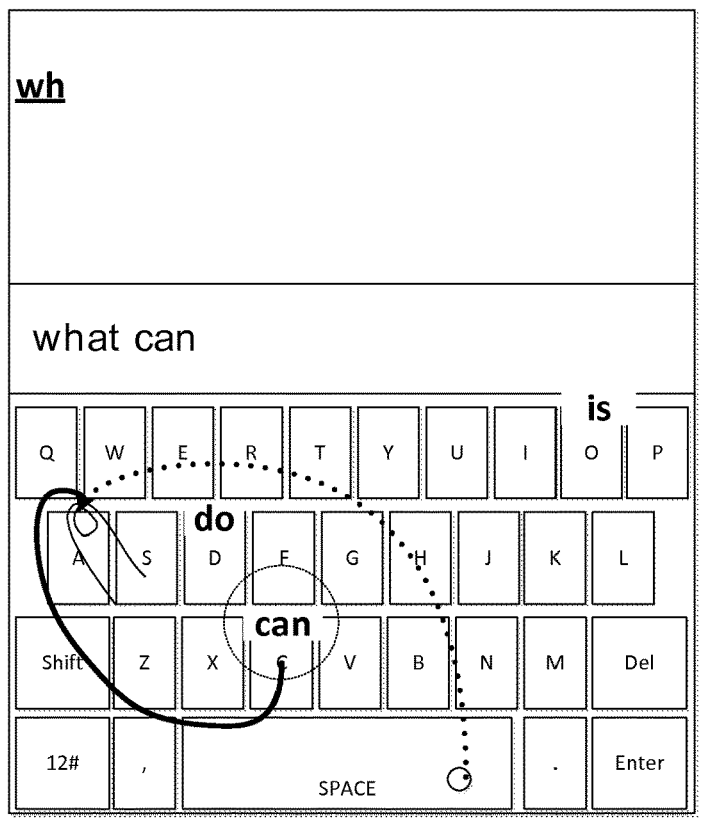

(4) With the sliding trajectory proceeding without being lifted into the identification region of the word "can", i.e., the location marked by the dashed-line circle in FIG. 21D, "can" is also selected and displayed in the candidate-word box.

Figure 21E:
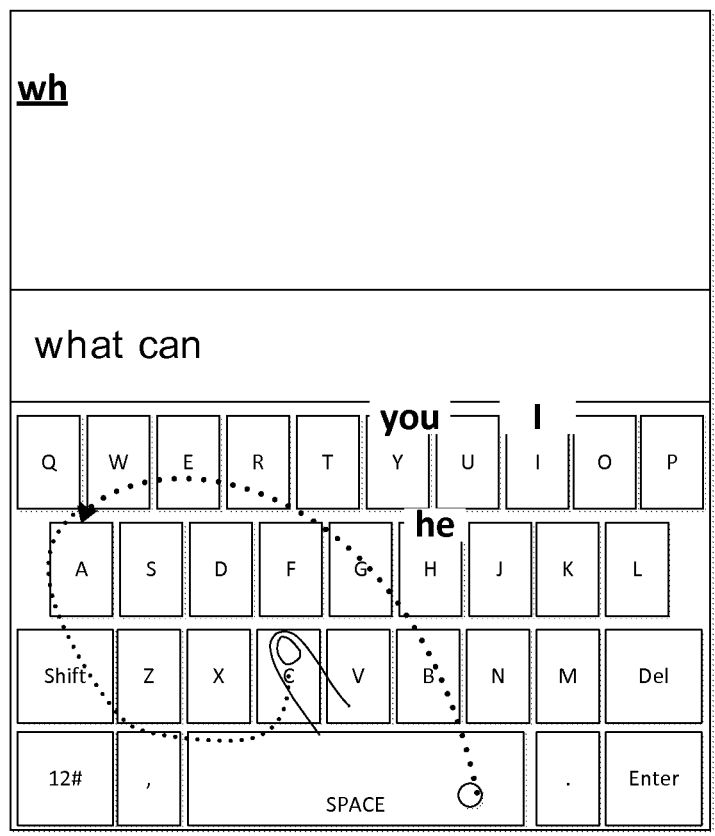

(5) Based on the word combination "what can" in the candidate-word box, the prediction of possible next words, i.e., "I", "he" and "you" shown in FIG. 21E, is conducted and the predicted words update the displayed content in the key area.

(6) The finger is still allowed to slide to other desired words to select them, i.e., repeating steps (2) to (5).

Figure 21F:

(7) After the finger is lifted, i.e., the touch being terminated, the input is stopped and the words in the candidate-word box are transferred to the text area, as shown in FIG. 21F.

Example 7

Figure 22A:
FIGS. 22A, 22B, 22C, 22D, 22E and 22F are schematics illustrating user manipulation in a seventh example of the present invention.
Figure 22B:

Referring to FIGS. 22A to 22B, in the context of the Chinese language, the system predicts possible next Chinese characters or words based on an input of letter(s) by the user and updates the key area of the keyboard with the results of the prediction in a real-time fashion.

(1) Based on "tian" input by the user, characters or words resulting from a prediction, e.g., "天", "田", "填" and "添", as shown in FIG. 22A are displayed according to the inventive rules in the candidate-word box. At the same time, words associated with the default result "天" are displayed around letter keys that correspond to the first phonetic alphabets of the respective subsequent characters of the words. As a result, for example, "天气" is displayed around the letter key "Q", "天津" around "J", "天亮了" around "L", and "天下" around "X". In addition, as "tian" can also be construed as the pinyin of the Chinese word "提案", this word is also displayed around the corresponding letter key "T".

(2) Assuming that the word "天气" is desired by the user, a circle can be drawn around the word to trigger the consecutive slide input mode and simultaneously, as shown in FIG. 22B, and cause "天气" to be selected and displayed in the candidate-word box.

Figure 22C:

(3) Based on the word "天气" displayed in the candidate-word box, possible next characters or words, e.g., "好", "差", "不错" and "天津" as shown in FIG. 22C, are predicted and displayed to update the content in the key area. During this process, although "冷" is also a result of the prediction, as the current touch point of the user is located over the letter key "Q", trajectories of extension of the user's sliding trajectory to "热", "好" and "不错" may be overlapped or blocked by the trajectory of extension to "冷", and also since it has a priority level that is lower than those of "热", "好" and "不错", "冷" is not displayed.

Figure 22D:
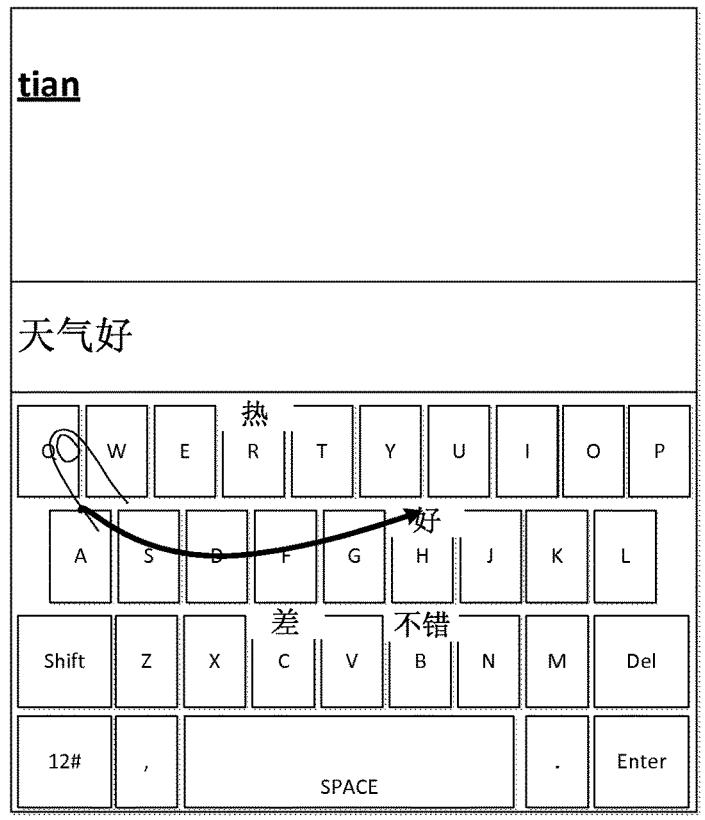
Figure 22E:

(4) With the gesture proceeding, for example, into the identification region of "好", i.e., the location marked by the dashed line in FIG. 22D, without the finger being lifted off the screen, "好" is selected and further displayed in the candidate-word box.

(5) The phrase "天气好" in the candidate-word box can serves as the basis for predicting and electing possible next characters or words, e.g., "心情好", "闷", "热" and "冷", followed by updating the content displayed in the key area according to the inventive rules.

(6) The finger is still allowed to slide to other desired words to select them, i.e., repeating steps (3) to (5).

Figure 22F:

(7) Upon the finger being lifted, i.e., the touch being terminated, the input operation is ceased and the phrase in the candidate-word box are transferred to the text area, as shown in FIG. 22F.

These examples are provided merely for the purpose of facilitating the understanding of the subject matter of the present invention and shall in no way be construed as limiting the scope of thereof. As a matter of course, all substantive equivalents of the embodiments disclosed above, as well as all other easily imaginable embodiments also fall within the scope of the subject matter of the present invention. Wherein the embodiments disclosed above also include all those implicitly disclosed thereby.

As described above, the methods, system and device according to the present invention can predict a series of candidate words or word combinations based on the context and the user's input preference and arrange them around corresponding keys of the keyboard according to predefined display rules. In addition, the user is allowed to make a sliding trajectory, i.e., a single operation, consecutively over the desired ones of the words or combinations displayed in the keyboard to input multiple words, which can form a complete sentence or even a block of text. Moreover, the arrangement of the words or combinations is flexibly adaptive to various keyboard layouts, for example, a QWERTY-based or other full-alphabet layout, a half-QWERTY layout, an alphanumeric keypad layout, and even a layout defined by the user. All of these achieve an effective increase in input efficiency and entail "smart" word prediction and arrangement.

Further, according to the present invention, words and/or word combinations obtained from the dictionary database are processed according to the system-predefined word display and arrangement rules, thereby enabling the positioning of predicted next words possibly to be input by the user around corresponding keys in the keyboard. This allows the user to perform rapid selection of candidate words and continuous text input in a convenient and smooth way without the need to switch operations between the keys and candidate-word area. Therefore, in addition to a great improvement in the input efficiency, the user can further have more comfortable inputting experience.

While the invention has been described herein with reference to specific embodiments thereof, it is apparent that many changes and variations can be made without departing from the scope or spirit of the invention. Therefore, the description and drawings are, accordingly, to be regarded as illustrative rather than restrictive.

The invention claimed is:

1. A method for inputting text by consecutive slide, comprising:
    predicting one or more first possible words to be input based on a context and an input of the user and updating content displayed in a keyboard layout to display the one or more predicted first possible words in a key area of the keyboard layout;
    in response to detecting that a consecutive slide input mode is triggered, detecting and recording a sliding gesture applied by the user to a touch-screen;
    while the sliding gesture is applied by the user, selecting, based on the sliding gesture, one of the displayed one or more first possible words and inputting the selected first possible word to a text area;
    while the sliding gesture is applied by the user and in response to selecting and inputting the selected first possible word to the text area, predicting one or more next possible words based on the first possible word that has been selected and input to the text area;
    while the sliding gesture is applied by the user, updating the content displayed in the keyboard layout to display the one or more predicted next possible words in the key area of the keyboard layout, the one or more predicted next possible words being arranged according to one or more word display and arrangement rules; and
    while the sliding gesture is applied by the user, selecting, based on the sliding gesture, one of the displayed one or more next possible words and inputting the selected next possible word to the text area.

2. The method of claim 1, wherein predicting one or more first possible words to be input comprises one or a combination of the following:
    predicting a first possible word when part, but not all, of its letters have been input;
    predicting a related word; and
    correcting a current input of the user and predicting a first possible word based on the results of the correction.

3. The method of claim 1, wherein said one or more word display and arrangement rules comprises:
    first letter correspondence-based display;
    a next letter or a next phonetic alphabet to the current input correspondence-based display;
    inter-word distance and word length-based display;
    touch point position and sliding gesture trajectory-based display; and
    word use frequency, user input preference, language models, syntax rules, context and other relevant statistical information-based display.

4. The method of claim 3, wherein the inter-word distance and word length-based display comprises one or more of the following:
    determining whether target display regions of at least two words are excessively close to each other and, if true, only displaying one of the at least two words with a highest priority level or adjusting the target display region of each other one of the at least two words with a lower priority level; and
    determining whether a length of a word affects another word to be displayed at an adjacent target display region and, if true, only displaying one of the two words with a high priority level or adjusting the target display region of the other of the two words with a low priority level.

5. The method of claim 3, wherein the touch point position and sliding gesture trajectory-based display comprises one or more of the following:
    determining whether a target display region of a word is to be blocked by a current touch point and, if true, not displaying the word or adjusting its target display region; and
    determining whether target display regions of at least two words are to be overlapped or blocked by a trajectory of a current touch point and, if true, for each of the at least two words, further determining, according to their priority levels, whether to display it or adjust its target display region, such that it will not be overlapped or blocked by a possible subsequent extension of the trajectory.

6. The method of claim 3, further comprising: prioritizing multiple ones of the word display and arrangement rules.

7. The method of claim 3, wherein said updating the content displayed in a keyboard layout to display the one or more predicted first possible words further comprises obtaining a displaying position using one or more of the following means:
    displaying at least one of the predicted first possible words above, or at the top left of, at the top right of, under, at the bottom left of, or at the bottom right of an associated key, or a predetermined region of an associated key that is spaced apart from the associated key by a distance not exceeding a system-predefined distance threshold;

displaying at least one of the predicted first possible words in the keyboard layout as well as in a candidate-word area; and displaying at least one of the predicted first possible words in the key area of the keyboard layout according to a current touch point of the user.

8. The method of claim 7, wherein displaying the one or more predicted first possible words in the key area of the keyboard layout further comprises: updating displayed content in the key area of the keyboard layout in a real-time manner according to an input of the user.

9. The method of claim 1, wherein in the event that no first possible words to be input are predicted based on the context and the input of the user, an indication is given in the form of one or a combination of a visual indication, an auditory indication and a vibration.

10. The method of claim 1, wherein selecting, based on the sliding gesture, one of the displayed one or more first possible words comprises:

determining whether the sliding gesture meets one or more of the following system-predefined word selection criterion;

determining whether a touch point is located in a system-predefined, associated effective region of a first possible word, and when the touch point is located in said effective region, selecting the first possible word;

determining whether there is a predetermined sliding gesture, and selecting a corresponding first possible word or a related word of the corresponding first possible word by the sliding gesture; and determining whether there are simultaneous multiple touch points and selecting a corresponding first possible word if yes.

11. The method of claim 1, further comprising performing one or more of the following:

calculating associated effective regions of the one or more predicted first possible words and determining whether a current touch point is located within an effective region of a predicted first possible word;

in the event of a change occurring in a current touch point, recalculating and rearranging target display regions of the one or more predicted first possible words;

determining whether the number of predicted first possible words to be displayed exceeds a maximum displayable word number, or determining whether one or more of the predicted first possible words are located on a trajectory of the sliding gesture of the user, or determining whether a predicted first possible word to be displayed conflicts with words that have been displayed, and displaying the predicted first possible words according to the determination result; and cancelling the display of or rearranging a predicted first possible word word unsuitable to be immediately displayed.

12. The method of claim 1, wherein the consecutive slide input mode is triggered by one or more of: a sliding gesture starting from the space key; a sliding gesture starting from an arbitrarily designated key; a sliding gesture starting from a sensitive point located away from the key area; a user-defined motion made around a displayed word; a predetermined motion made in an arbitrarily designated region; a predetermined action taken on a corresponding electronic device; and a sliding command.

13. The method of claim 1, further comprising displaying a sliding gesture trajectory of the sliding gesture by: displaying the whole sliding gesture trajectory; or displaying only a portion of the sliding gesture trajectory produced in an immediately previous user-defined time frame and causing it to gradually disappear from the screen when its display time has exceeded a user-defined threshold.

14. The method of claim 1, wherein the consecutive slide input mode exits when the occurrence of a system-predefined exit triggering event is detected.

15. The method of claim 1, further comprising performing one or more of the following anti-blockage treatments on word information displayed in the keyboard area while the sliding gesture is applied by the user: keyboard duplication, word relocation and word rearrangement.

16. The method of claim 1, further comprising:

detecting whether the consecutive slide input mode is triggered in response to another input of the user.

17. A system for inputting text by consecutive slide, comprising at least:

a dictionary database adapted to store word information;
a processor; and
a memory for storing instructions executable by the processor, wherein the processor in communication with the dictionary database is configured to:

process an interaction with a user, record information input by the user in an area of a keyboard and transmit the information;

receive the information and an event, sort and process the information and the event, obtain a list of one or more predicted first possible words from the dictionary database based on selection rules and in accordance with the information, and pass the obtained list;

provide the user with displayed content, display and arrange at least one of the one or more predicted first possible words according to system-defined word display and arrangement rules in a key area of the keyboard;

in response to detecting that a consecutive slide input mode is triggered, detect and record a sliding gesture applied by the user to a touch-screen;

while the sliding gesture is applied by the user, select, based on the sliding gesture, one of the displayed one or more predicted first possible words and input the selected first possible word to a text area;

while the sliding gesture is applied by the user and in response to selecting and inputting the selected first possible word to the text area, obtain a list of one or more predicted next possible words from the dictionary database based on selection rules and based on the first possible word that has been selected and input to the text area;

while the sliding gesture is applied by the user, update the content displayed in the keyboard layout to display the one or more predicted next possible words in the key area of the keyboard layout, the one or more predicted next possible words being arranged according to one or more word display and arrangement rules; and while the sliding gesture is applied by the user, select, based on the sliding gesture, one of the displayed one or more next possible words and input the selected next possible word to the text area.

18. The system of claim 17, wherein the processor is further configured to: in response to detecting that the consecutive slide input mode is triggered, transmit information about a current touch point or trajectory, as well as the one or more predicted first possible words obtained from the dictionary database, according to system-predefined word display and arrangement rules;
- when the consecutive slide input mode is not triggered, transmit only the one or more predicted first possible words obtained from the dictionary database according to system-predefined word display and arrangement rules;
- determine whether one of the one or more predicted first possible words meets a system-predefined word selection criterion based on information about the displayed at least one of the one or more predicted first possible words in combination with a trajectory of a current moving or slide gesture of the user;
- if the system-predefined word selection criterion is met, transmit the word meeting the word selection criterion the text area; otherwise, produce no output.

19. The system of claim 18, wherein the information about the displayed at least one of the one or more predicted first possible words comprises one or more of: the number, display positions and coordinates of the display positions, of the displayed at least one of the one or more predicted first possible words.

20. The system of claim 17, wherein the word display and arrangement rules comprises one or a combination of: letter correspondence-based display of a word in a corresponding region in the key area; inter-word distance and word length-based display; touch point position and sliding gesture trajectory-based display; and word use frequency, user input preference, language models, syntax rules, context and other relevant statistical information-based display.

21. The system of claim 17, wherein the processor is further configured to:
- detecting whether the consecutive slide input mode is triggered in response to another input of the user.

* * * * *